(12) United States Patent
Bowman

(10) Patent No.: US 7,571,251 B2
(45) Date of Patent: Aug. 4, 2009

(54) PATH OPTIMIZER FOR PEER TO PEER NETWORKS

(75) Inventor: Don Bowman, Waterloo (CA)

(73) Assignee: Sandvine Incorporated ULC, Waterloo, Ontario (CA)

( * ) Notice: Subject to any disclaimer, the term of this patent is extended or adjusted under 35 U.S.C. 154(b) by 526 days.

(21) Appl. No.: 10/138,336

(22) Filed: May 6, 2002

(65) Prior Publication Data
US 2003/0208621 A1 Nov. 6, 2003

(51) Int. Cl.
*G06F 15/173* (2006.01)
(52) U.S. Cl. .................... 709/242; 709/230
(58) Field of Classification Search ......... 709/201–203, 709/205, 223, 225, 242, 200, 238, 246; 370/238, 370/395, 244, 351; 707/10, 3; 711/122; 455/466
See application file for complete search history.

(56) References Cited

U.S. PATENT DOCUMENTS

| | | | | |
|---|---|---|---|---|
| 5,617,539 A | * | 4/1997 | Ludwig et al. | 709/205 |
| 5,946,316 A | * | 8/1999 | Chen et al. | 370/408 |
| 6,029,195 A | * | 2/2000 | Herz | 725/116 |
| 6,185,598 B1 | * | 2/2001 | Farber et al. | 709/200 |
| 6,246,669 B1 | * | 6/2001 | Chevalier et al. | 370/238 |
| 6,256,309 B1 | * | 7/2001 | Daley et al. | 370/395.43 |
| 6,415,280 B1 | * | 7/2002 | Farber et al. | 707/2 |
| 6,542,964 B1 | * | 4/2003 | Scharber | 711/122 |
| 6,567,856 B1 | * | 5/2003 | Steele et al. | 709/238 |
| 6,631,128 B1 | * | 10/2003 | Lemieux | 370/351 |
| 6,653,933 B2 | * | 11/2003 | Raschke et al. | 370/203 |
| 6,801,905 B2 | * | 10/2004 | Andrei | 707/2 |
| 6,813,631 B2 | * | 11/2004 | Pouchak et al. | 709/203 |
| 6,850,965 B2 | * | 2/2005 | Allen | 709/203 |
| 6,877,034 B1 | * | 4/2005 | Machin et al. | 709/223 |
| 6,938,095 B2 | * | 8/2005 | Basturk et al. | 709/238 |
| 6,981,055 B1 | * | 12/2005 | Ahuja et al. | 709/238 |
| 6,993,475 B1 | * | 1/2006 | McConnell et al. | 704/7 |
| 7,065,579 B2 | * | 6/2006 | Traversat et al. | 709/230 |
| 7,080,030 B2 | * | 7/2006 | Eglen et al. | 705/26 |
| 7,174,382 B2 | * | 2/2007 | Ramanathan et al. | 709/227 |
| 7,333,482 B2 | * | 2/2008 | Johansson et al. | 370/353 |

(Continued)

FOREIGN PATENT DOCUMENTS

WO WO 02/15035 A 2/2002

(Continued)

OTHER PUBLICATIONS

Developing a query optimizer for a federated database system Zhao-Ping Yu; Egyhazy, C.; Intelligent Information Systems, 1997. IIS '97. Proceedings Dec. 8-10, 1997 pp. 420-427.*

(Continued)

*Primary Examiner*—Thong H Vu
(74) *Attorney, Agent, or Firm*—Borden Ladner Gervais LLP; Neil Henderson

(57) ABSTRACT

The invention disclosed is a path optimizer for Peer to Peer (P2P) networks. Large amounts of P2P file exchanges increase the costs to maintain a network. Network service providers typically pay for the amount of data they exchange with other network service providers. The present invention examines P2P messages between and within networks and provides a cost efficient path to handle each P2P message.

69 Claims, 16 Drawing Sheets

U.S. PATENT DOCUMENTS

| | | | |
|---|---|---|---|
| 2002/0073088 A1* | 6/2002 | Beckmann et al. | 707/10 |
| 2002/0133534 A1* | 9/2002 | Forslow | 709/200 |
| 2002/0143855 A1* | 10/2002 | Traversat et al. | 709/202 |
| 2002/0143944 A1* | 10/2002 | Traversat et al. | 709/225 |
| 2002/0145981 A1* | 10/2002 | Klinker et al. | 370/244 |
| 2002/0152299 A1* | 10/2002 | Traversat et al. | 709/223 |
| 2002/0194108 A1 | 12/2002 | Kitze | |
| 2003/0009587 A1 | 1/2003 | Harrow et al. | |
| 2003/0041095 A1* | 2/2003 | Konda et al. | 709/201 |
| 2003/0158958 A1* | 8/2003 | Chiu | 709/231 |
| 2003/0172059 A1* | 9/2003 | Andrei | 707/3 |
| 2003/0174648 A1* | 9/2003 | Wang et al. | 370/235 |
| 2003/0191558 A1* | 10/2003 | Arellano | 700/237 |
| 2004/0095907 A1* | 5/2004 | Agee et al. | 370/334 |
| 2005/0021862 A1* | 1/2005 | Schroeder et al. | 709/246 |
| 2005/0233759 A1* | 10/2005 | Anvekar et al. | 455/466 |

FOREIGN PATENT DOCUMENTS

| | | |
|---|---|---|
| WO | 0221378 | 3/2002 |
| WO | WO/02/31615 A2 | 4/2002 |
| WO | WO 02/097557 A2 | 12/2002 |

OTHER PUBLICATIONS

Protocol Support for Optimized, Context Sensitive..—Kümmel, Hutschenreuther ; ATM, a physical peer-to-peer throughput of 155 Mbit/s wwwrn.inf.tu-dresden.de/lsrn/Ps-Files/ICODP97.ps.*

Cost-based Query Scrambling for Initial Delays—Urhan, Franklin, Amsaleg (1998) www.cs.umd.edu/users/urhan/cbscramb-camera.ps.*

Cache-Conscious Data Placement—Calder, Krintz, John, Austin (1998) www.cse.ucsd.edu/~calder/papers/ASPLOS-98-CCDP.ps.Z.*

Sandvine—Managing P2P traffic on DOCSIS Networks, Feb. 2002.

Sandvine—Sandvine to Present Business Case at Investor Forum.

* cited by examiner

PATH OPTIMIZER FOR PEER TO PEER NETWORKS

FIELD OF THE INVENTION

The present invention relates to providing a peer to peer path optimizer (PPO) to examine peer to peer networking messages and dynamically and transparently redirect them to a cost efficient path.

BACKGROUND OF THE INVENTION

Peer to peer (P2P) networking has emerged as a popular form of exchanging data such as movies or music among individuals using the Internet. In a P2P network each computer in the network has the same responsibilities as each of the others, i.e. it is a "peer". Many variations of P2P networks have been created, at the time of writing the most prevalent being: Napster, Kazaa and Gnutella. The use of P2P for transferring large amounts of multimedia data such as movies or music has significantly increased the amount of information transmitted on the Internet.

P2P has led to increased financial pressure for network service providers. A network service provider is an entity that maintains a group of computers or nodes that form a network. Examples of networks include but are not limited to: a network controlled by an Internet Service Provider (ISP), a corporate network or a university network.

A network service provider typically must pay a fee for the traffic to and from their network.

Given the popularity of P2P networking, it is difficult for any network service provider to block P2P traffic. The network service provider is left with few choices, namely:
a) tiered bandwidth services, and the hope that users will pay for additional bandwidth, or
b) capping the amount of bandwidth available to P2P applications, which could cause dissatisfaction among the user base.

Thus, there is a need for an alternative approach, which allows a network service provider to cost effectively constrain P2P traffic through their network, while maintaining or improving existing performance to the user. The present invention addresses this need.

SUMMARY OF THE INVENTION

The present invention is directed to a peer to peer optimizer, the optimizer examining peer to peer messages between nodes within networks connected to the optimizer, for the purpose of optimizing behavior on each of said networks.

The present invention is also directed to a peer to peer optimizer, the optimizer examining peer to peer messages between nodes within networks connected to the optimizer, for the purpose of determining a cost efficient path for each peer to peer message.

The present invention is also directed to a process for managing peer to peer messages between and within networks, the process comprising the step of determining a cost efficient path for each of the peer to peer messages.

The present invention is also directed to a computer readable medium containing instructions for managing peer to peer messages between nodes in networks, the medium comprising instructions for optimizing behavior on the networks.

The present invention is further directed to a system for optimizing peer to peer messages between nodes within networks, the system comprising a peer to peer optimizer, the system utilizing the optimizer to examine messages between the nodes for the purpose of optimizing behavior on each of the networks.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION OF THE INVENTION

Figure 1:
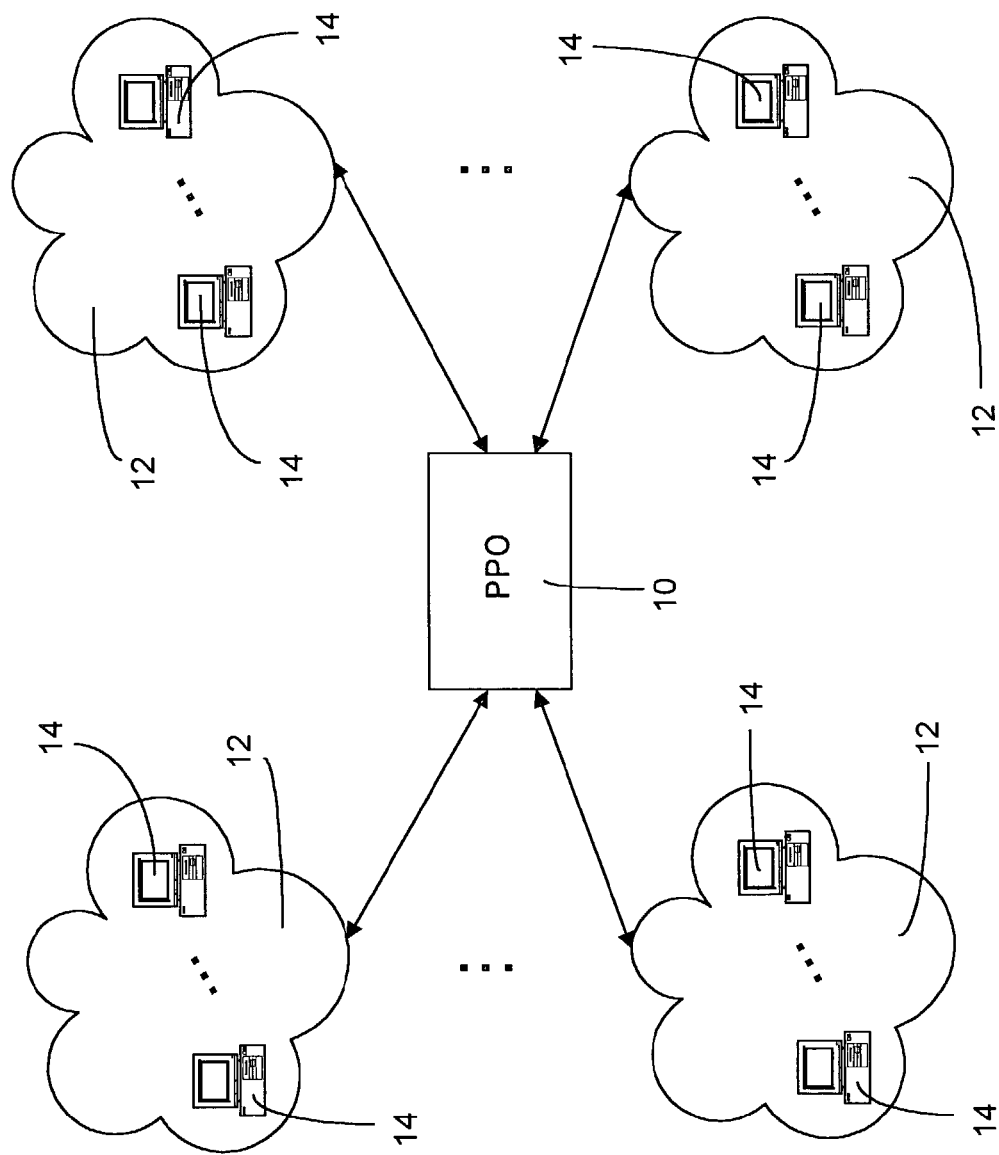
FIG. 1 is a block diagram of networks connected to the present invention.

FIG. 1 is a block diagram of networks connected to the present invention. Peer to Peer optimizer (PPO) 10 monitors all P2P traffic between a plurality of networks 12. Examples of networks 12 include but are not restricted to; a network controlled by an ISP, a corporate network, or a University network. Networks 12 would typically be connected to PPO 10 via the Internet, but that is not a requirement of the present invention. Any network 12 that is capable of providing or requesting P2P traffic may make use of PPO 10.

To minimize the cost of P2P traffic, network 12 utilizes PPO 10 to determine a cost efficient path for exchanging P2P data between nodes 14. A node 14 is any computer that is capable of receiving or transmitting P2P data.

Figure 2:
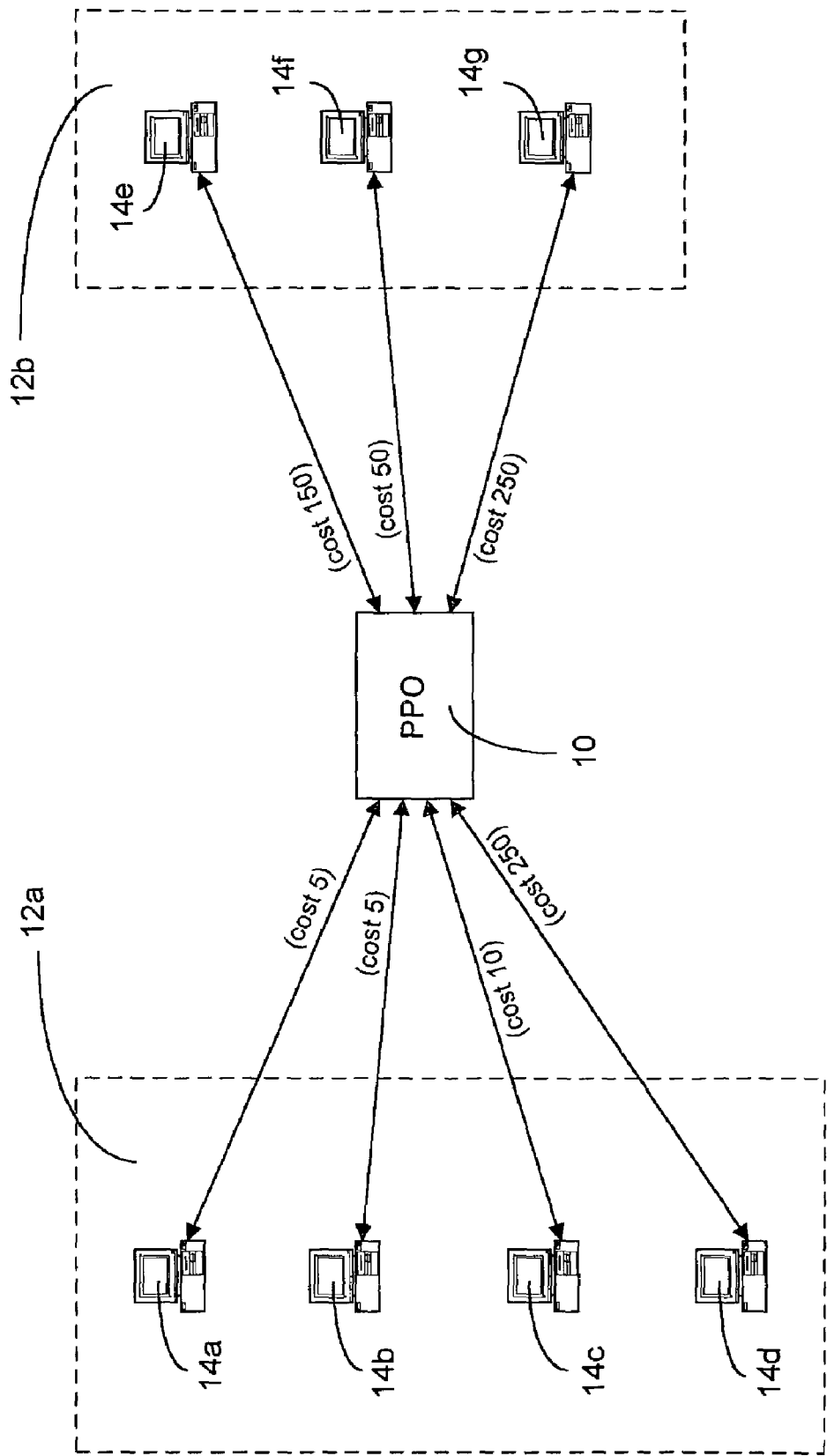
FIG. 2 is a block diagram of a plurality of nodes connected to a PPO.

Referring now to FIG. 2, a block diagram of a plurality of nodes connected to a PPO 10 is shown. Each network 12a and 12b contains a plurality of nodes 14. For each node 14 that it is aware of, PPO 10 maintains a cost class. Table 1 illustrates the cost class for each node of FIG. 2.

TABLE 1

| Node | Cost Class |
|------|------------|
| 14a  | 5          |
| 14b  | 5          |
| 14c  | 10         |

TABLE 1-continued

| Node | Cost Class |
|------|------------|
| 14d  | 250        |
| 14e  | 150        |
| 14f  | 50         |
| 14g  | 250        |

Assuming that a P2P request can be serviced within a single network such as 12a, then typically the most cost efficient paths for P2P transfer will be within network 12a. Examples would be connections to nodes 14a and 14b. However, this may not always be the case. For example a request to node 14d may be very expensive if node 14d which contains the data, resides halfway around the world within a corporate intranet. In such a scenario, node 14f, within network 12b, which contains the required data, would be a more cost efficient choice.

In determining a cost efficient path for the delivery or reception of P2P data, PPO 10 combines the cost class of each node on the end of a potential exchange of data. This combination results in a path cost value. For example, a request from node 14e for a file on node 14a may result in a path cost of 155. This example is one of simple addition to the cost class of two nodes to determine a path cost. The inventor does not intend to restrict the present invention to any specific algorithm to obtain a path cost. For example, a weighting factor may be applied to nodes with a high cost class to exclude them from consideration in calculating a path cost.

Figure 3:
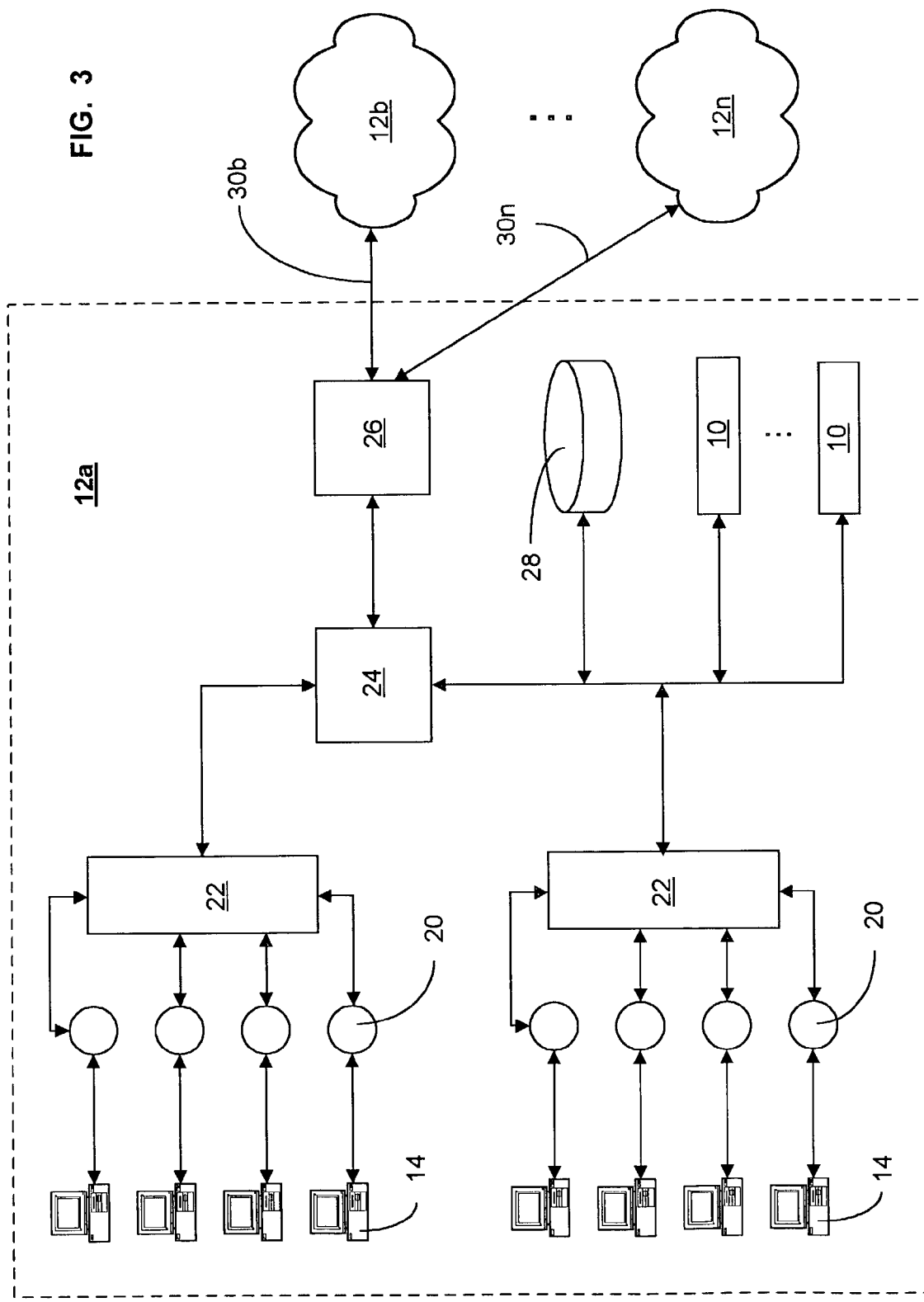
FIG. 3 is a block diagram of an ISP system.

In FIG. 3, a block diagram of an ISP system is shown. FIG. 3 illustrates how an Internet Service Provider (ISP) may make use of the present invention. Network 12a is the network maintained by an ISP. Network 12a is connected to a plurality of networks 12b to 12n via links 30b to 30n. Typically networks 12b to 12n would be accessible via the Internet, but they may be any form of network which contains files for P2P exchange. Network 12a comprises a plurality of nodes 14. P2P data is exchanged between nodes 14 within network 12a and nodes within networks 12b to 12n. A node 14 may be the computer of a home user, a business computer or a corporate server connected to any of networks 12a to 12n. Returning to the present ISP example of FIG. 3, each node 14 within network 12a is connected to a communications module 20, which allows node 14 to communicate with network 12a. Communications module 20 may be Digital Subscriber Line Access Multiplexer (DSLAM) which is used for phone line connections. Communications module 20 may also be a Cable Modem Termination System (CMTS) which is used for cable connections. Communications module 20 may also be a module that accepts dialup connections, wireless connections or fiber optic connections. The point here being that communications module 20 connects a node 14 to network 12a. An aggregator 22 collects the data to and from communications modules 20 and is connected to distribution router 24 for this purpose. Distribution router 24 determines where a request for information should be routed within network 12a. Distribution router 24 is connected to core router 26, one or more cache servers 28 and one or more P2P Path Optimizers (PPO) 10. Core router 26 is connected to networks 12b to 12n most typically by InterXchange Carrier (IXC) links 30b to 30n. An IXC is a telecommunications company such as AT&T. A cache server 28 is a repository of information obtained from networks 12b to 12n that may be frequently accessed by nodes 14. To avoid the expense of continually requesting data from networks 12b to 12n network 12a may store frequently accessed information in one or more caches 28. Most commonly this would be current versions of popular websites, but may include all forms of data. Cache 28 may also commonly be referred to as a "cache cluster" or a "cache server".

PPO 10 is where the present invention resides. PPO 10 serves to provide three main functions:
1) Reorganize networks connected to PPO 10. This is achieved by intercepting all P2P messages and attempting to have nodes connect to other nodes in the same cost class. This allows the networks to reorganize in two ways:
   a) they become flatter as nodes connect to nodes under the control of a PPO 10 thus a tree of connections between nodes would have at most a depth of one; and
   b) PPO 10 attempts to connect nodes to other nodes within a network, where without the use of a PPO 10, connections would be random and a tree of connections between nodes may have an unlimited depth.
2) Reduce network traffic. This is done by not broadcasting messages but instead sending them where they need to go, or dropping them if there is no need to send them on.
3) Redirecting traffic to a cost efficient path.

Each of these functions is discussed in more detail below.

Although the example of FIG. 3 applies to the network of an ISP, it is not the intent for the inventors to restrict the use of the present invention to an ISP network. Any network for which an entity wishes to control P2P traffic in a cost efficient manner may make use of the present invention. As discussed above examples would be a corporate network or a University network or any commercial use of a large network, such as the hotel industry.

Before describing in detail the structure of PPO 10, we will refer first to how it may be utilized in a variety of P2P models.

Figure 4:
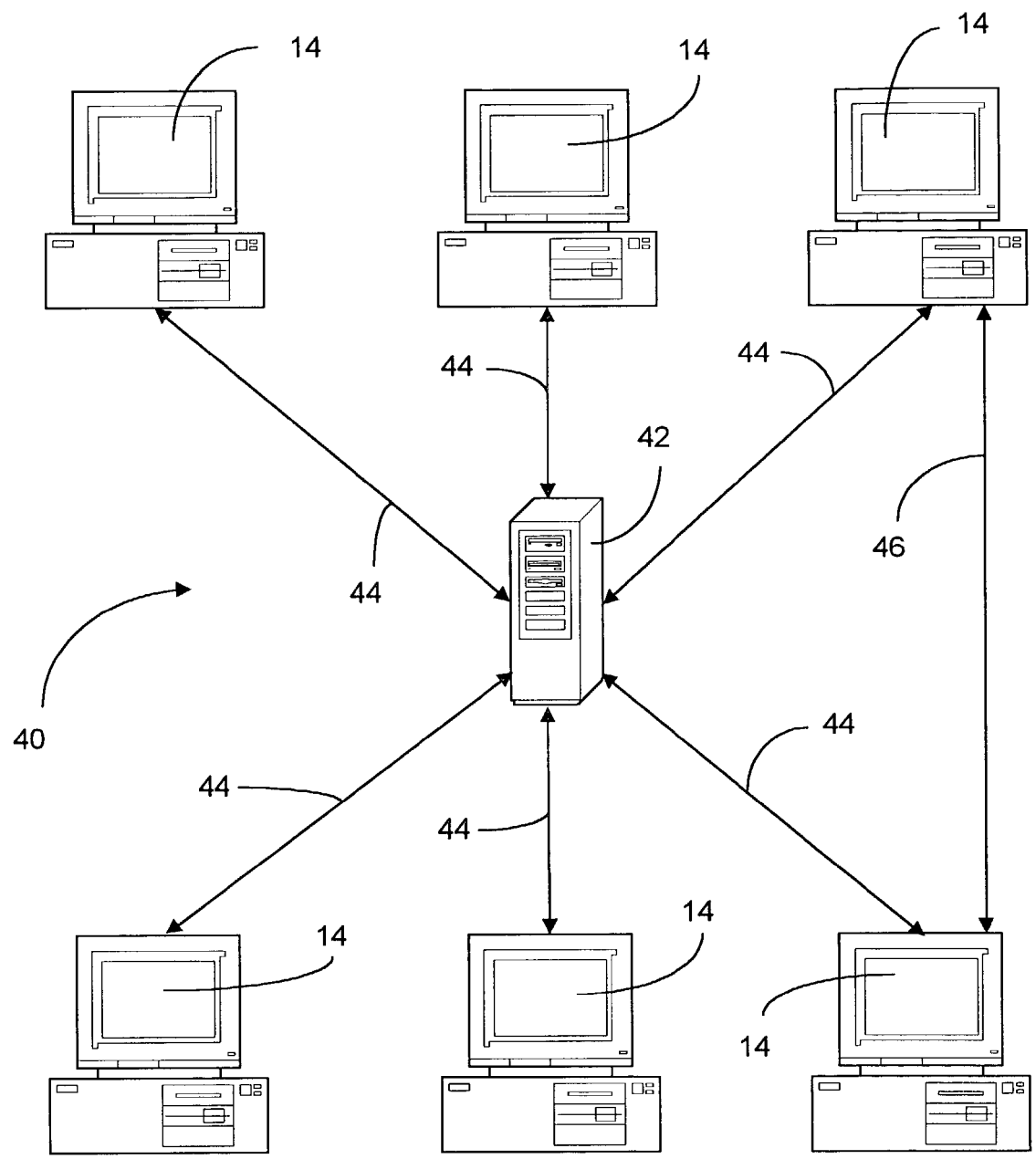
FIG. 4 is a block diagram of a centralized server network.

Referring now to FIG. 4, a block diagram of a centralized server network is shown generally as 40. Network 40 is an example of a first generation P2P network, such as Napster. Napster is an Internet service that was originally designed to permit users to exchange MP3 music files. In network 40, a central server 42 connects a plurality of nodes 14 via connections 44. Connections 44 would typically be connections via the Internet. A node 14 sends a request for a file to central server 42 via a connection 44. Central server 42 provides a reply via connection 44 indicating on which node 14 the requested file resides. In essence central server 42 contains a directory of all files available for access on all nodes 14. In acting on the reply, the requesting node 14 establishes a connection with its peer node 14 that contains the file and requests a copy of the file, as is shown in transfer link 46.

Figure 5:
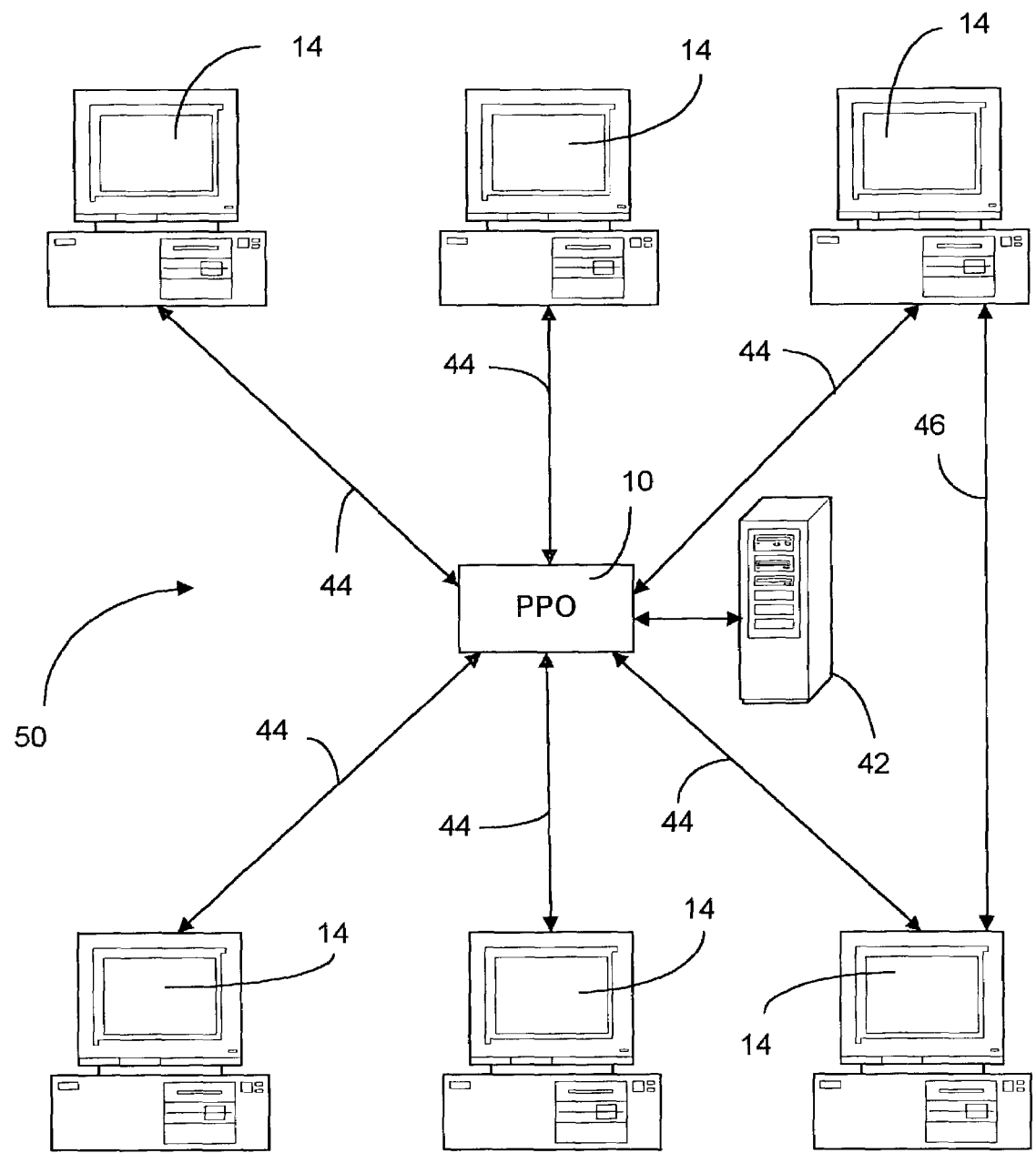
FIG. 5 is a block diagram of a centralized server network utilizing a PPO.

To explain how FIG. 4 may make use of the present invention we refer now to FIG. 5 where a block diagram of a centralized server network utilizing a PPO is shown generally as 50. In network 50, PPO 10 examines search requests sent to central server 42. If PPO 10 is aware of the requested file, it will provide the requester with a cost efficient path to the file. If PPO 10 is not aware of the file it will utilize alternatives to direct the requestor to the file. These alternatives are discussed in detail later. In determining which node 14 to direct the request to, PPO 10 makes use of cost class information. Cost class information for a node would typically be determined by metrics such as the speed of the connection to the node (e.g. bandwidth and distance) and the monetary cost of using a connection to the node. Cost class information would typically reflect a monetary cost to obtain a file from a specific node 14. An administrator of the present invention may set their own cost class to a node 14 or PPO 10 may set them by default or determine them dynamically. Whatever the method of establishing the cost class for a node, the point is that each node has a cost associated with it and PPO 10 utilizes this information to provide a cost efficient path for exchanging P2P data.

Figure 6:
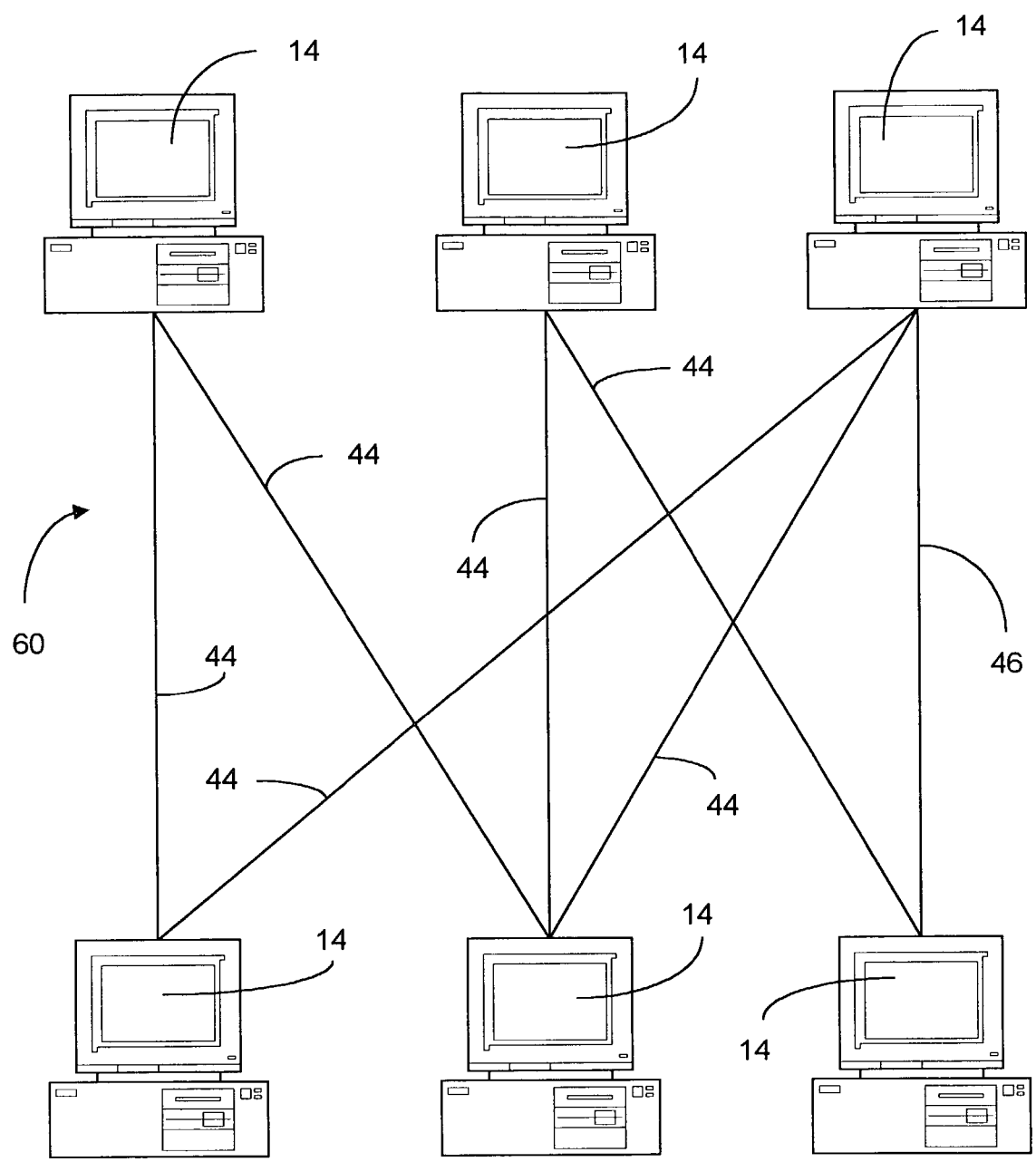
FIG. 6 is a block diagram of a decentralized server network.

Referring to FIG. 6, a block diagram of a decentralized server network is shown generally as 60. Network 60 utilizes a distributed model where each node 14 is equal and there is no central server 42 as with network 40 (FIG. 4). Network 60 may be considered to be a second generation P2P network, an example of which would be Gnutella. Gnutella provides a file sharing service for many types of information and is not directed solely to the exchange of multimedia files. Each node 14 tries to maintain some number of connections 44 to other nodes 14 at all times. Requests for information are sent with a Time to Live (TTL) field that is decremented and then forwarded by each node 14 to all other nodes 14 to which it is connected. When the TTL value reaches zero, the request is dropped. This type of network has been shown to have significant scaling issues, as requests for information will degrade network performance. As with network 40 when a requested file is located a direct connection is made between two nodes to transfer the requested data as shown by transfer link 46.

Figure 7:
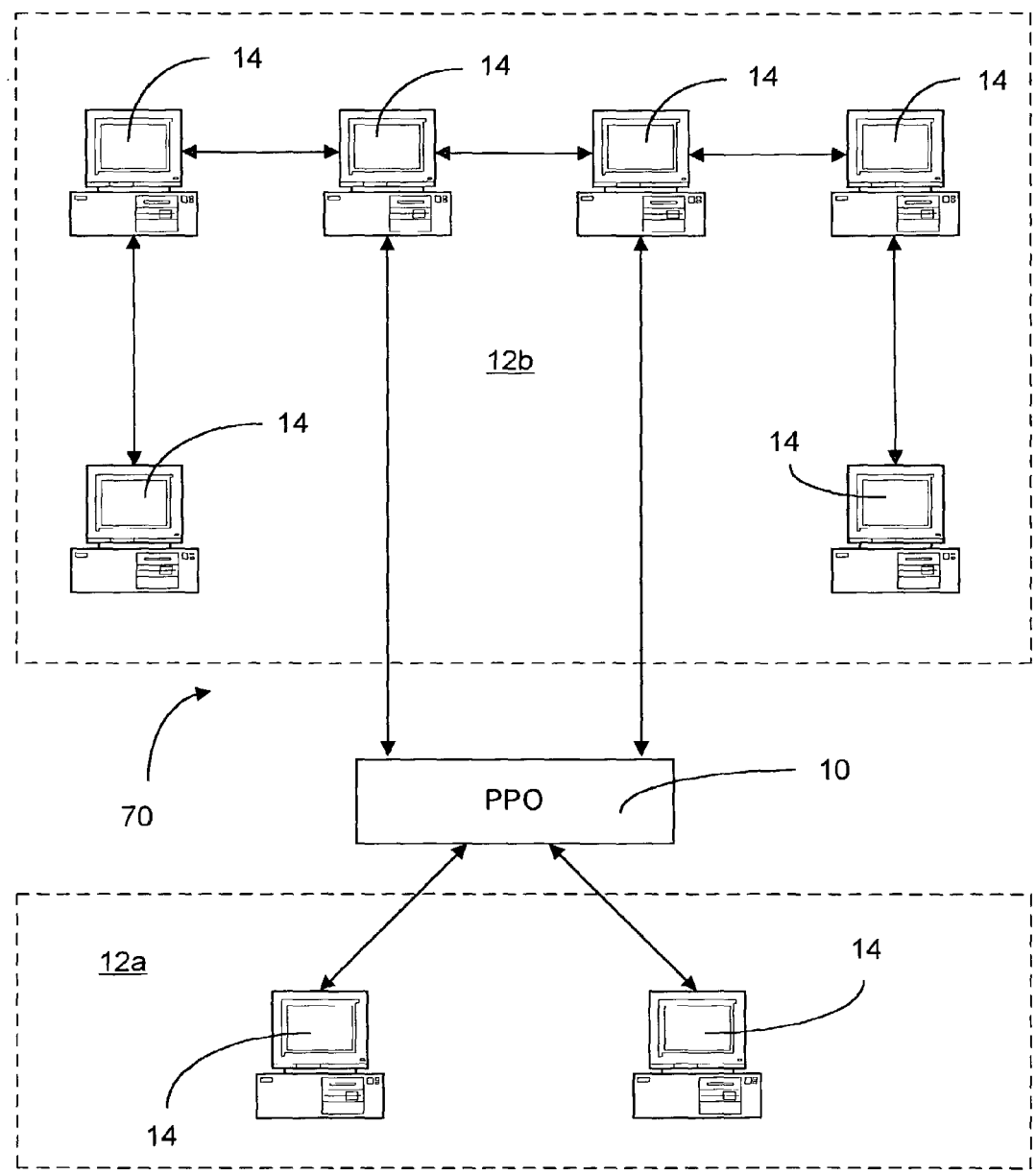
FIG. 7 is a block diagram of a decentralized P2P network utilizing a PPO.

In the present invention the topology of network 60 is reconfigured as shown in FIG. 7. FIG. 7 is a block diagram of a decentralized P2P network utilizing PPO 10 and is shown generally as 70. In network 70 when P2P communication is sent between networks 12a and 12b PPO 10 examines it. PPO 10 then determines a cost efficient manner to deal with the communication. It is not the intent of the inventor to restrict the use of the present invention to only two networks 12a and 12b as shown in FIG. 7.

Figure 8:
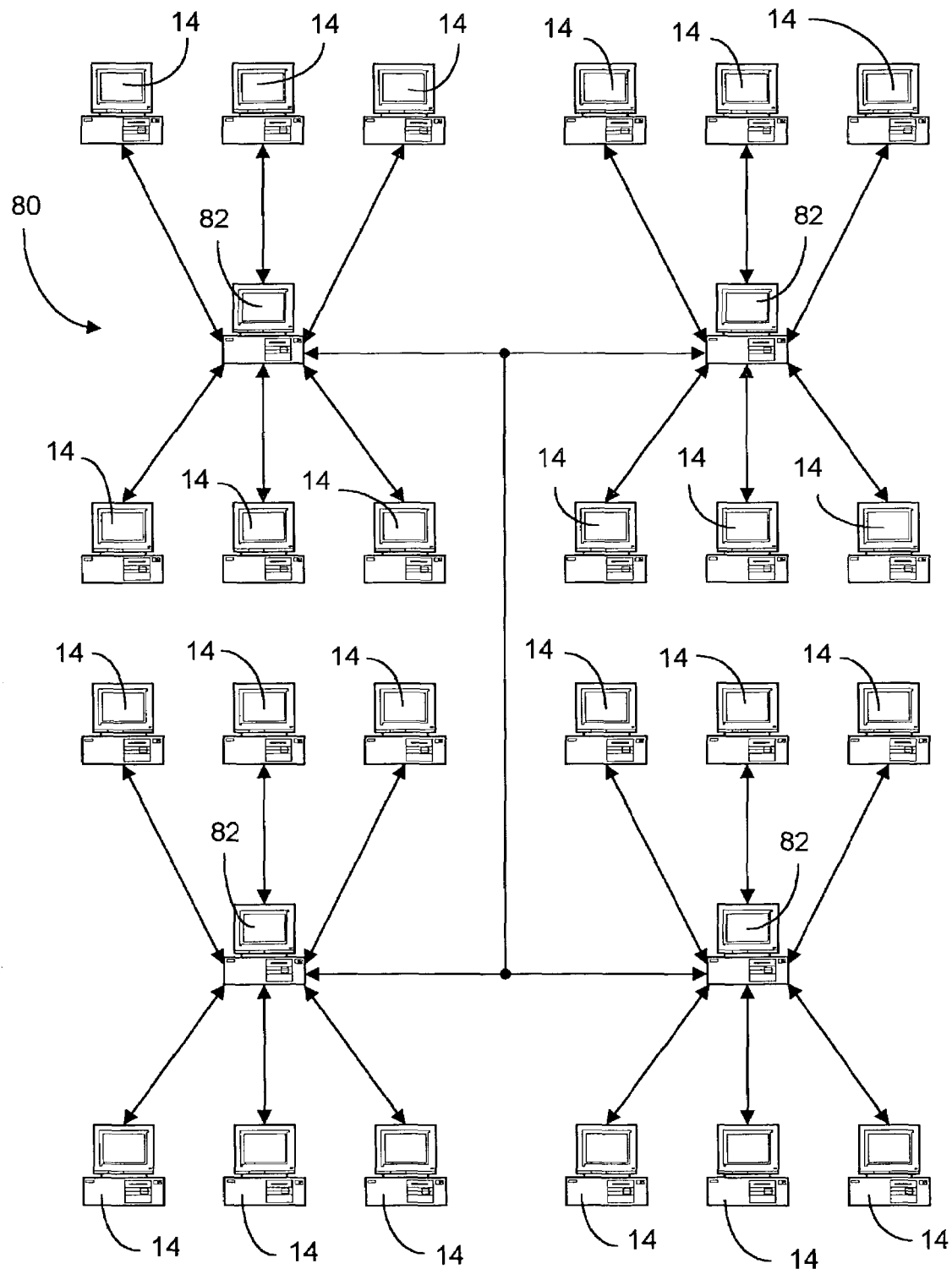
FIG. 8 is a block diagram of a hybrid P2P network.

Referring now to FIG. 8 a block diagram of a hybrid P2P network is shown generally as 80. This network topology may be referred to as third generation P2P where some nodes are elected as "supernodes" or "ultra peers" and serve as the traffic coordinator for the other nodes. In FIG. 8, supernodes are designated with the feature number 82 and are connected to each other. This model is utilized by P2P services such as Fasttrack, Kazaa, Morpheus and Grokster. The supernodes 82 change dynamically as bandwidth and network topology change. Any node 14 may be a supernode 82.

Figure 9:
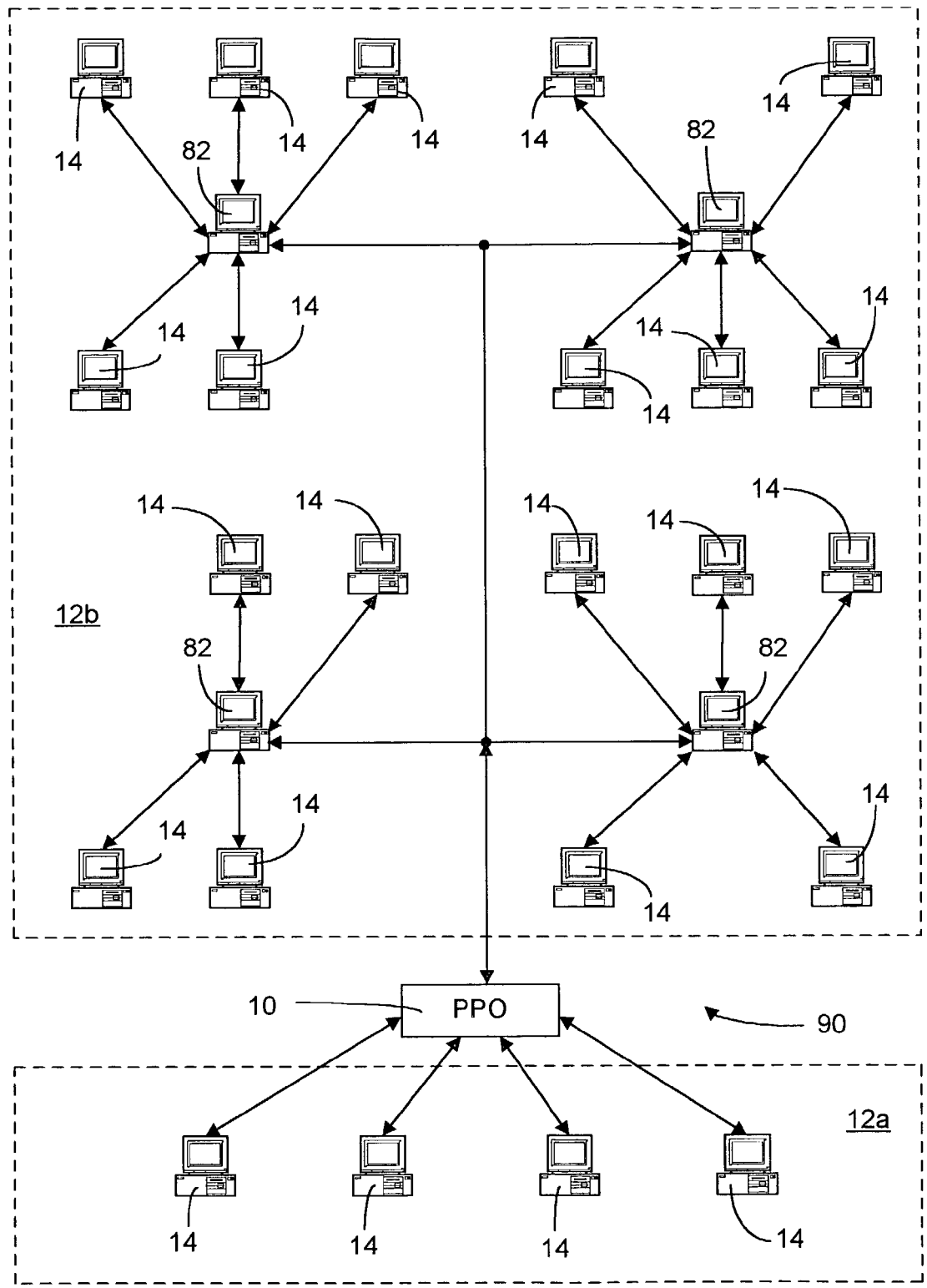
FIG. 9 is a block diagram of a hybrid P2P network utilizing a PPO.

Referring now to FIG. 9, a block diagram of a hybrid P2P network utilizing PPO 10 is shown generally as 90. In network 90, PPO 10 acts as a supernode between networks 12a and 12b. All nodes within network 12a will see PPO 10 as their supernode and thus as their path to network 12b. Nodes 14 within network 12a may also be supernodes within network 12a (not shown).

With regard to the topologies of the networks shown in FIGS. 4 to 9, it is the intent of the inventor to simply illustrate how the present invention may be utilized in existing P2P networks. It is not the intent of the inventor to restrict the present invention to the networks shown, but rather to provide examples of the diversity of the present invention.

Figure 10:
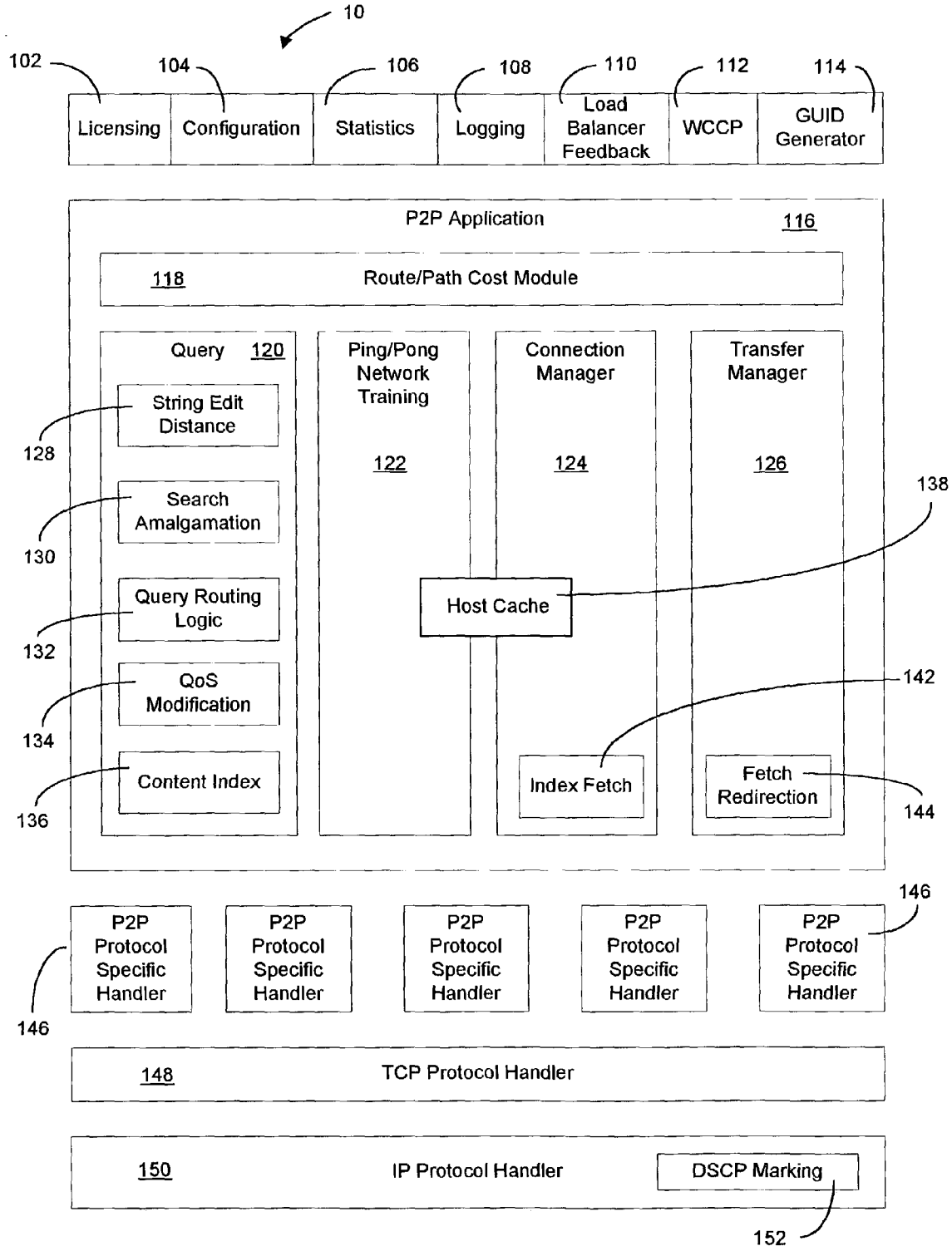
FIG. 10 is a block diagram of a PPO.

Referring now to FIG. 10 a block diagram of a PPO is shown generally as 10. As one skilled in the art can appreciate, PPO 10 may be implemented in many different ways. The structure of PPO 10 as shown in FIG. 10 serves only as an example of one implementation that may be used to examine and manage P2P communications. We will now describe the components of PPO 10 as illustrated in FIG. 10 in more detail.

Licensing module 102 is responsible for enforcing the maximum number of concurrent users of PPO 10 for which the customer (i.e. the owner of a PPO 10) has paid a license fee. Configuration module 104 maintains the configuration of PPO 10, such as the sub-networks and IP addresses of the nodes that reside within a network 12. Statistics module 106 maintains the statistics for PPO 10, such as the number of files redirected and the number of concurrent users. Logging module 108 is responsible for logging functions, such as when PPO 10 was started up or shut down and when the number of licenses was exceeded. Load balancer feedback module 110 provides a negative feedback loop to an external load balancer so that multiple PPO's under the control of a customer will receive equal traffic. WCCP module 112 operates with the Cisco Web Cache Communication Protocol (WCCP) to ensure that a router, such as distribution router 24 of FIG. 3 sends only P2P communications to one or more PPO's 10. As one skilled in the art can appreciate, a number of methods may be used to direct P2P traffic to a PPO 10, such as recognizing specific port addresses or context sensitive scanning of packets. WCCP serves only as one example. GUID generator 114 generates a globally unique identifier for each sender of a P2P packet to avoid the possibility of looping back to the original sender of the packet and to also uniquely identify messages that have been received.

P2P application 116 acts as the control program for PPO 10. Application 116 comprises: route/path cost module 118, query module 120, ping/pong network training module 122, connection manager module 124 and transfer manager module 126. Route/path cost module 118 assigns a path cost to each proposed connection based upon the cost class of each node in the connection.

Query module 120 comprises: string edit distance module 128, search amalgamation module 130, query routing logic module 132, QoS modification module 134 and content index module 136. String edit distance module 128 determines the similarity between the name of a requested file and the filenames known to PPO 10. Search amalgamation module 130 utilizes string edit distance module 128 to map the name of a requested file to the known files available, regardless of cost class. Query routing logic module 132 routes queries for a file to the nodes that are likely to contain the requested file. Module 132 maintains a list of all messages to and from a network 12. By maintaining such a list, module 132 may quickly drop spurious messages, such as requests for data that have not been acknowledged. QoS modification module 134 rewrites the routing information of module 132 to select a cost efficient path determined by route/path cost module 118. Routing information includes QoS parameters such as stated bandwidth and uptime. The purpose of rewriting routing information is to provide the requestor with a path to a file or files that make the most efficient use of network resources. By doing so a message may be redirected. Content index 136 maintains an index of content available for access in nodes 14 within networks 12. Content index 136 also contains the cost class for each node in which the content resides. Typically such content will be a file but may also include forms of data such as streaming media. It is not the intent of the inventor to restrict the use of the term "file" to any form of P2P data that may be examined by or transmitted through PPO 10.

Ping/Pong network training module 122 serves to fill host cache 138 with IP addresses of nodes 14 based upon the Ping messages received by PPO 10 from nodes 14. Ping/Pong network training module 122 sends a plurality of Pong messages in response to a Ping message in an attempt to train a network sending a Ping message. Pong messages are sent by PPO 10 for each node 14 that is in the same cost class as the sender of the Ping that PPO 10 is aware of. This use of multiple Pong messages serves to train the network that sent the Ping. This training provides the sending network with nodes other than those for which PPO 10 wishes to restrict traffic.

When a connection is established between a node 14 and PPO 10, connection manager 124 maintains the connection until the node 14 drops the connection. Index fetch module 142 is responsible for obtaining content names and adding them to content index 136.

Transfer manager 126 is in essence a proxy that handles the exchange of P2P data. Manager 126 utilizes fetch redirection module 144 to redirect a request for content to a node with a lower path cost. A node 14 may make a request for a specific file on another node 14. If that file is available via a more cost efficient path, fetch redirection module 144 will silently direct the request to another node having a more cost efficient path.

A plurality of P2P protocol specific handlers 146 are responsible for maintaining a specific P2P protocol, for example Gnutella or Fasttrack. Transmission Control Protocol (TCP) handler 148 ensures the maintenance of correct TCP behavior. Similarly, Internet Protocol (IP) handler 150 serves the same purpose for IP. It is not the intent of the inventor to restrict the present invention to the use of TCP and IP. These serve only as an example. As one skilled in the art can appreciate any number of communication protocols may be used, including, but not restricted to: ATM, UDP, and wireless.

Differentiated Services Code Point (DSCP) marking module 152, utilizes Differentiated Services (DiffServ or DS) to specify IP packets by class so that certain types of packets get precedence over others. For example a limit may be imposed on the number of P2P packets allowed to enter or leave a network 12. Such a feature is optional but may be used by networks that find P2P data is consuming too much of their bandwidth. As one skilled in the art can appreciate any number of schemes such as packet snooping or recognizing specific port addresses may be utilized to identify P2P traffic. It is not the intent of the inventor to restrict the ability to limit P2P traffic to the DSCP solution.

PPO 10 optimizes behavior between and within the networks 12 to which it is connected. Behavior is the ability to create, destroy, modify or ignore messages. Behavior optimizes future behavior of each network 12, not just the current message. An example of creating a message is a false pong. An example of destroying a message is deleting a message that has already been answered or in the case of Gnutella, a message whose TTL has expired. Modification is not limited to QoS modification module 134. For example, search amalgamation module 130 may modify messages to reflect the closest filename as determined by string edit distance module 128. In the case of a specific protocol, for example Gnutella, modification may include overwriting the TTL portion of the message when forwarding the message. Similarly the GUID for a message may be changed if needed. In essence, depending upon the protocol, PPO 10 may modify messages as required to optimize network behavior. An example of ignoring a message is to ignore a query request to a node in a network, as traffic from that network has been restricted.

In order for PPO 10 to examine and act upon P2P requests, it must be aware of a variety of P2P protocols. This functionality is handled by P2P protocol specific handlers 146.

By way of example we refer next to how a P2P protocol specific handler 146 may interface with the Gnutella protocol. It is not the intent of the inventor to restrict the present invention to work simply with the Gnutella protocol, but rather to provide a practical example of how the present invention may deal with P2P requests.

Figure 16:
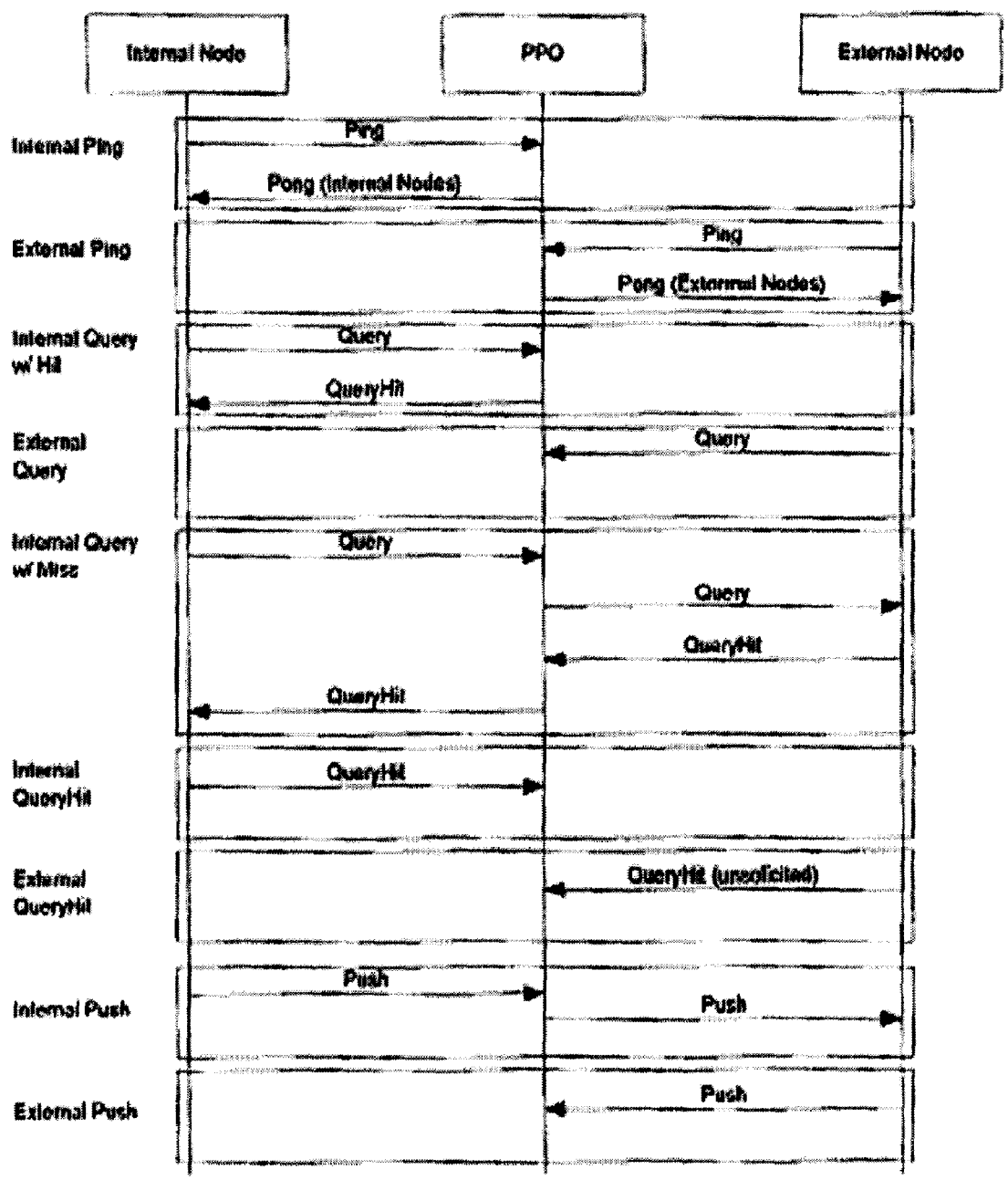
FIG. 16 is a chart illustrating how PPO 10 may be used to examine and redirect P2P traffic between networks.

The Gnutella protocol has five message types, namely: ping, pong, query, queryhit and push. How a handler 146 handles each of these messages is shown FIG. 16. In FIG. 16, the term "internal node" refers to a node 14 within network 12*a* of the ISP example of FIG. 3. The term "external node" refers to a node 14 within a network 12*b* to 12*n* of FIG. 3. By the use of the terms "internal node" and "external node" the inventor means to show how PPO 10 may be used to examine and redirect P2P traffic between nodes in an "internal" network such as an ISP and nodes in an "external" network such as a plurality of sites on the Internet.

FIG. 16 illustrates how PPO 10 may be used to examine and redirect P2P traffic between network. In the following description of FIG. 16, we advise the reader refer to FIGS. 3 and 10 as well as FIG. 16.

A ping message is used to determine if a node 14 is active, and helps to establish a database of active nodes in host cache 138 of FIG. 10. PPO 10 responds to a ping message with a pong message. To avoid identifying a node 14 within network 12*a*, PPO 10 would typically provide a forged pong message. The forged pong message would indicate the number of files shared and the amount of data shared within network 12*a* containing the pinged node 14, as well as the IP address and port of the pinged node. Similarly in this example, PPO 10 does not forward pong messages, however it does receive them and adds them to the list of nodes in host cache 138 from which it may obtain data.

A query message is a search message containing a fragment of a filename, in other words, a request for data. In the present example, incoming query messages from an external node are dropped, thus appearing to be a query miss and thereby avoiding servicing a P2P request from a network 12*b* to 12*n*. It is not the intent of the inventor to require that query messages be dropped, it is simply one method that may be used to restrict unwanted P2P traffic into network 12*a*. Implementations utilizing PPO 10 may choose to allow free flow of all messages or to provide a limited amount of traffic. Query messages from a node 14 within network 12*a* are forwarded first to the nodes 14 containing the requested file that have a cost efficient path. Typically these would be nodes 14 within network 12*a*, but that may not always be the case. The nodes 14 having the requested data will then respond with queryhit messages. If there are no matches for the request for data, or if no queryhit message is returned, then the query message is sent to a random set of nodes 14 within network 12*a*. One method of determining the random set of nodes 14 to receive the query message would be to use a weighted probabilistic function such as a round robin method based upon the number of files available from each node 14. In this way, the query does not always go to the node 14 having the largest number of files. If there is still no match, the query is forwarded to nodes 14 having the lowest path cost in networks 12*b* to 12*n*.

A queryhit message is a response to a query message. Incoming queryhit messages from nodes in networks 12*b* to 12*n* are forwarded to the appropriate node 14 within network 12*a*. Incoming queryhit messages from nodes 14 within network 12*a* are forwarded back to the requesting node within network 12*a* and not sent out to networks 12*b* to 12*n*.

A push message is used when the transmitting node has a firewall and the receiving node does not. The receiving node sends a push message, which causes the transmitting node to open a connection directly to the receiving node. Incoming push requests may be optionally dropped by PPO 10 and are propagated unchanged on the way out of network 12*a*.

By way of example on how the present invention may be utilized to provide support for the Gnutella protocol, we will now refer to logical flow diagrams 11 to 15. As with the previous discussion with regard to Chart 1, we will be referring to the components of FIG. 3 by way of example.

Figure 11:
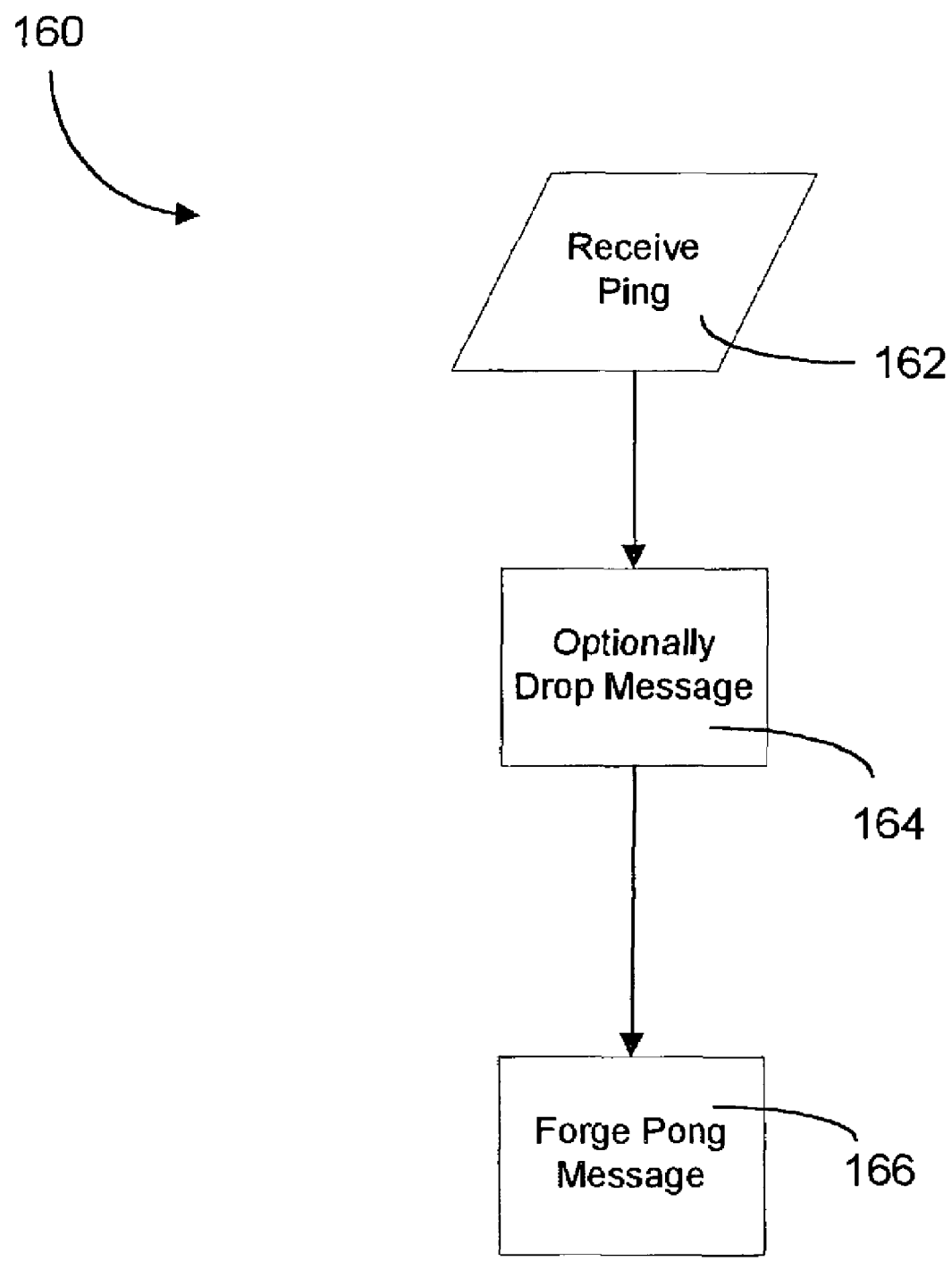
FIG. 11 is a logical flow diagram illustrating the processing of a ping message.

Referring now to FIG. 11, a logical flow diagram illustrating the processing of a ping message is shown generally as 160. Beginning at step 162, a ping message is received. At step 164 the ping message is optionally dropped and if dropped, is not propagated within network 12a. At step 166 a forged Pong message is created. The forged pong response may contain the number of files available for P2P exchange within network 12a. The forged pong message may be sent to each node to connected to PPO 10 in order to train a network as described earlier with reference to ping/pong training module 122 of FIG. 10.

Figure 12:
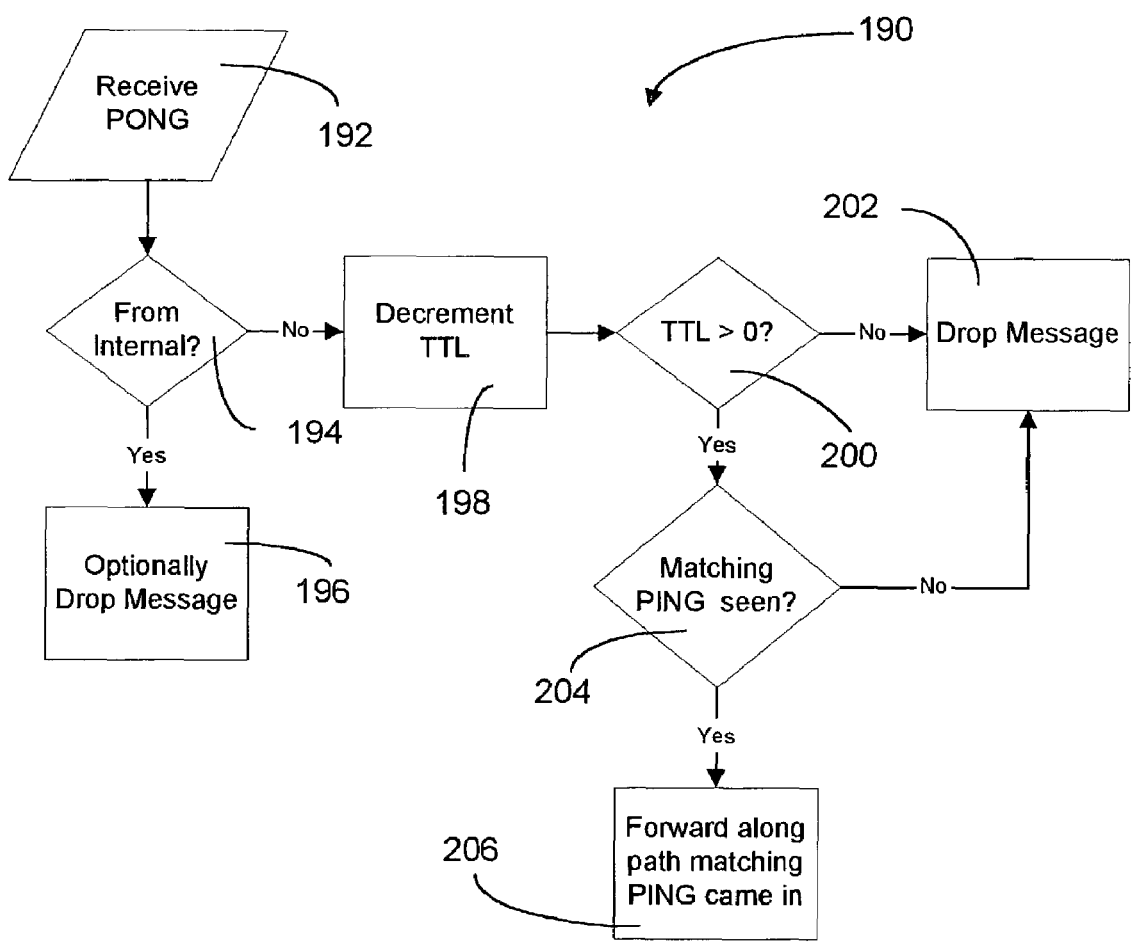
FIG. 12 is a logical flow diagram illustrating the processing of a pong message.

Referring now to FIG. 12, a logical flow diagram illustrating the processing of a pong message is shown generally as 190. Process 190 begins at step 192 with the receipt of a pong message. At step 194 a test is made to determine if the message is from a node 14 within network 12a. If the message is from a node 14 within network 12a the message may be optionally dropped at step 196. If the message is from a node 14 in a network 12b to 12n, processing moves to step 198 where the TTL for the message is decremented. Processing then moves to step 200 where a test is made to determine the current value of the TTL. If the TTL has expired, the message is dropped at step 202. If the TTL has not expired, processing moves to step 204 where a test is made to determine if a ping message to match the pong message has been received. PPO 10 stores messages it receives under the control of query routing logic module 132 (FIG. 10). Typically a message is not stored for long as most P2P requests for information are resolved within less than a minute. If no matching ping message is found, the pong message is dropped at step 202. If a matching ping message has been seen, then the pong message is forwarded to the source of the original ping message at step 206.

In the above description of FIG. 12, the inventor makes reference to Time To Life (TTL). TTL information is utilized by the Gnutella protocol, but not by all other protocols. For other protocols not recognizing TTL, the logic if FIG. 11 would be modified to remove steps 198, and 200. Thus control would flow from step 194 in the negative case directly to step 204.

Figure 13:
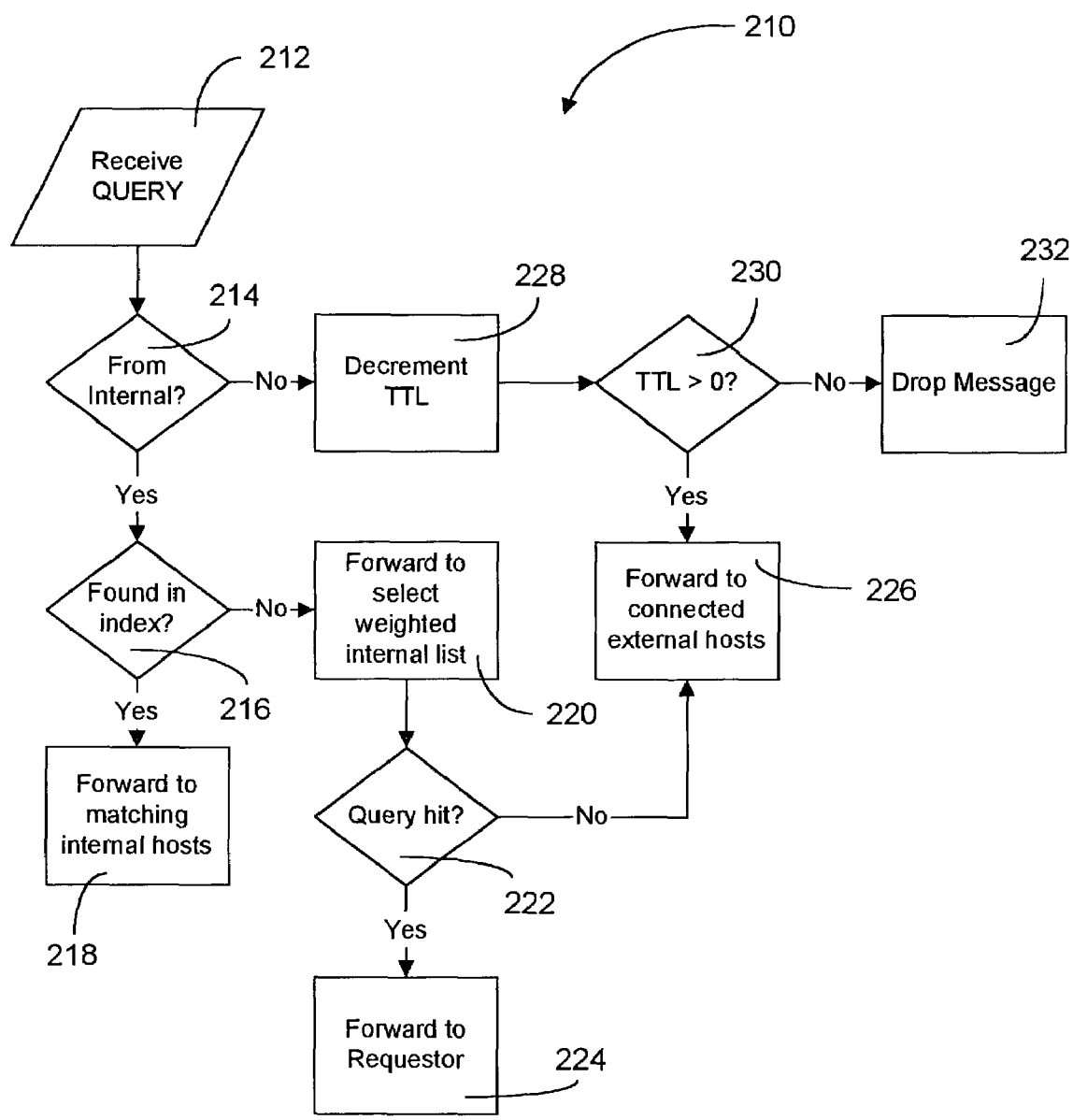
FIG. 13 is a logical flow diagram illustrating the processing of a query message.

Referring now to FIG. 13, a logical flow diagram illustrating the processing of a query message is shown generally as 210. Process 210 begins at step 212 where a query message is received. At step 214 a test is made to determine if the query message came from a node 14 within network 12a. If this is the case processing moves to step 216 where a test is made to determine if the requested file is contained within network 12a as indicated by content index 136 (FIG. 10). If the file is contained within network 12a then processing moves to step 218 where the query message is forwarded to nodes 14 having the lowest cost class within network 12a. If the file is not found within network 12a then processing moves to step 220 where the query message is forwarded to a select weighted list of nodes 14 within network 12a. The intent here being that content index 136 may not be current and the requested file may reside within network 12a. One method of determining the set of nodes 14 to send the query message to would be to use a weighted probabilistic function such as a round robin method based upon the number of files available from each node 14 within network 12a. In this way, the query does not always go to a node 14 having the largest number of files.

A test is next made at step 222 to determine if the file has been located on a node 14 within network 12a. If the file has been located the location information is forwarded to the originator of the query message at step 224. If at step 222 the file has not been located, the query message is forwarded to a weighted subset of connected nodes having the lowest cost class in networks 12b to 12n at step 226. As mentioned before, a weighted round robin scheme may be utilized to select the nodes 14 in networks 12b to 12n to receive the query. A connected node is one that has established a communication path with PPO 10, for example via TCP/IP. Returning to step 214 if the query message is not from a node 14 within network 12a, processing moves to step 228 where the TTL value of the message is decremented. A test is then made at step 230 to determine if the TTL value for the message is greater than zero. If it is not, then the message is dropped at step 232 and processing ends. If the TTL value is less than or equal to zero then processing moves to step 226 where the query message is forwarded to all connected nodes in networks 12b to 12n. Optionally, if the query is from a node in networks 12b to 12n, the query may simply be dropped or returned to the requesting node at step 226, thus not requiring PPO 10 to forward the query to connected nodes.

As discussed above with reference to FIG. 12, if the communication protocol does not make use of TTL, then steps 228, 230 and 232 would be deleted. The negative case from step 214 would then flow to step 226.

Figure 14:
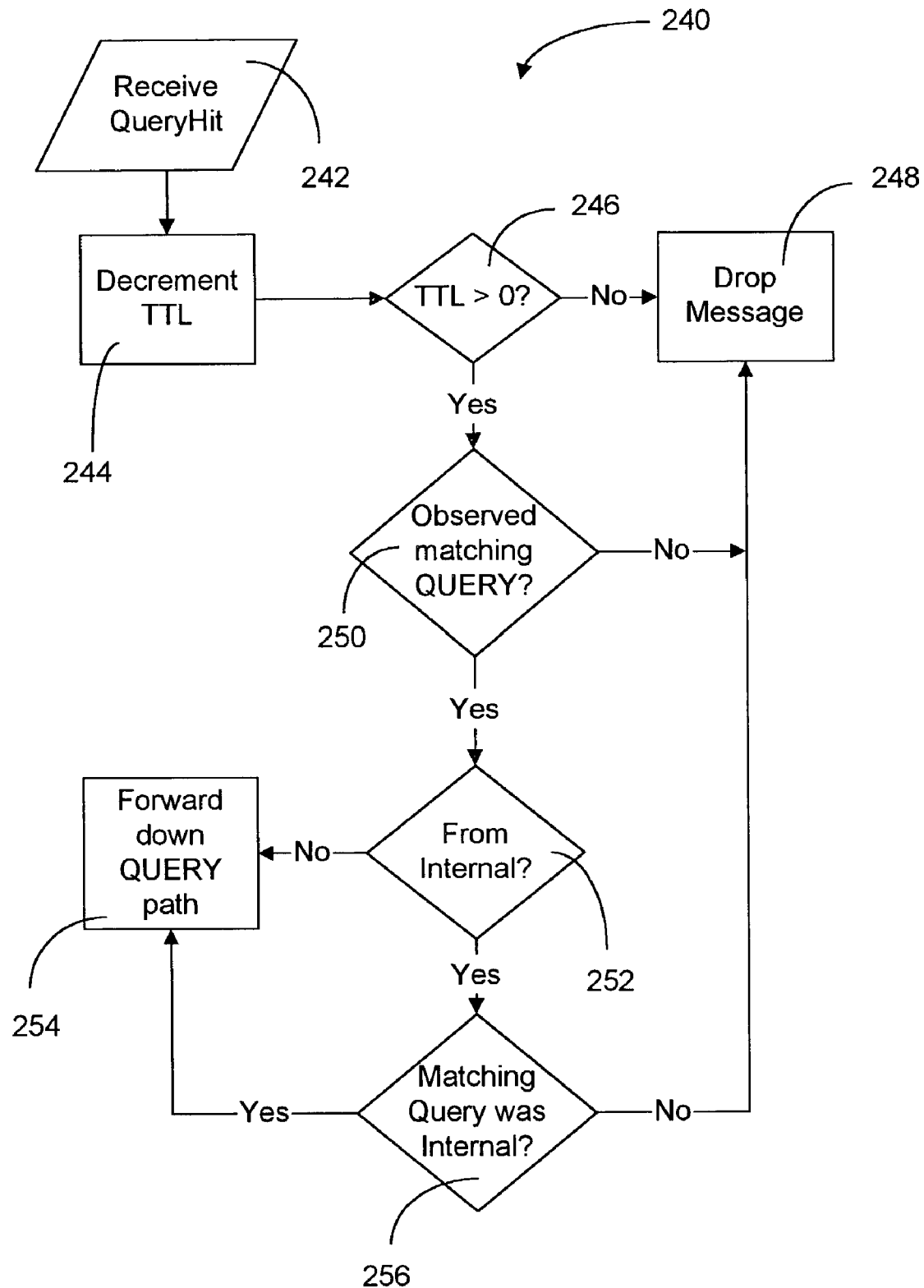
FIG. 14 is a logical flow diagram illustrating the processing of a queryhit message.

Referring now to FIG. 14, a logical flow diagram illustrating the processing of a queryhit message is shown generally as 240. Process 240 begins at step 242 where a queryhit message is received by PPO 10. Processing moves to step 244 where the TTL for the queryhit message is decremented. At step 246 if the TTL is less than or equal to zero than the message is dropped at step 248. If the TTL is greater than zero, processing moves to step 250 where a test is performed to determine if a matching query message had been received for the queryhit message. PPO 10 stores messages it receives under the control of query routing logic module 132 (FIG. 10). Typically a message is not stored for long as most P2P requests for information are resolved within less than a minute. If no matching query message was received, processing moves to step 248 where the message is dropped. If a matching query message was received, processing moves to step 252 where a test is made to determine if the queryhit message was from a node 14 within network 12a. If not, the queryhit message is then optionally forwarded to the node that made the original query at step 254. If at step 252 the queryhit message is determined to have come from a node 14 within network 12a, then processing moves to step 256. At step 256 a test is made to determine if the original query message corresponding to the queryhit message was from a node 14 within network 12a. If so, processing moves to step 254 where the message is forwarded to the node that made the original query. If not, processing moves to step 248 where the message is dropped.

Figure 15:
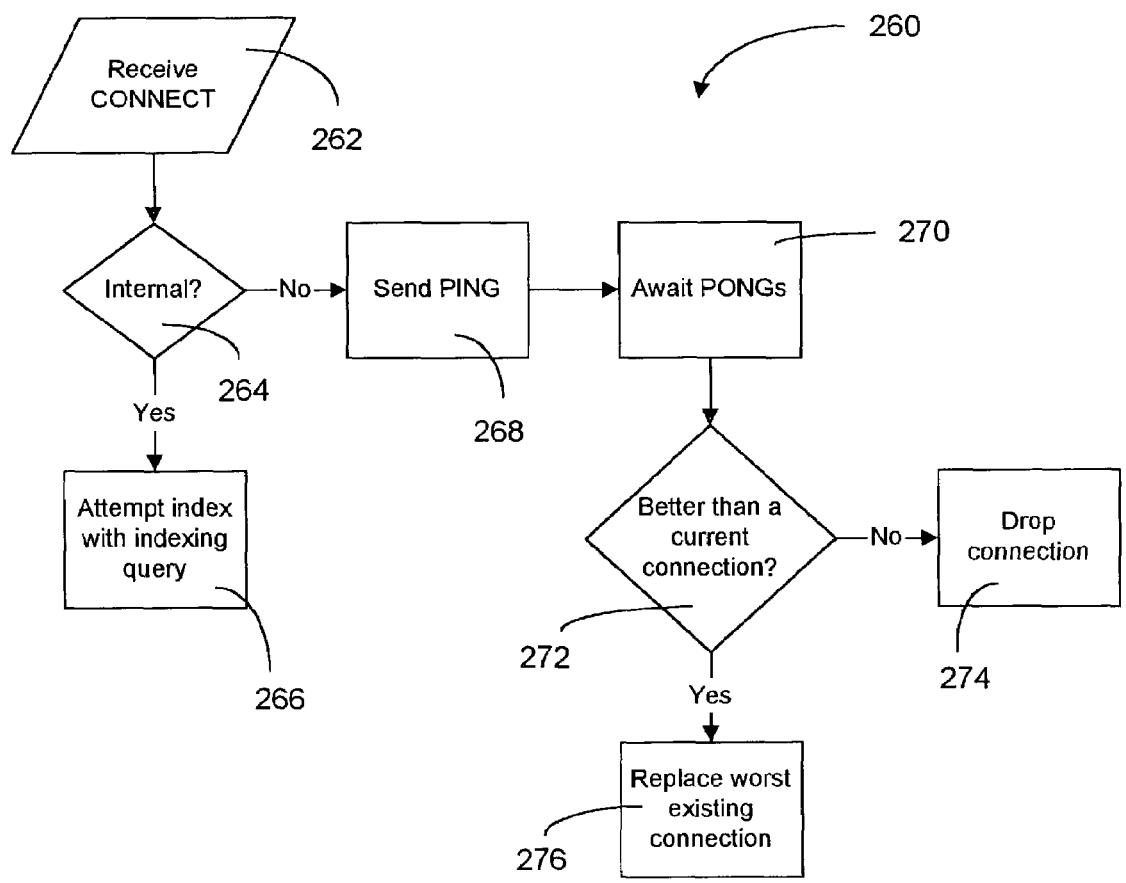
FIG. 15 is a logical flow diagram illustrating the processing of a connect request.

Referring now to FIG. 15 a logical flow diagram illustrating the processing of a connect request is shown generally as 260. Any node 14 may request a connection with any other node 14 at step 262. At step 264 a test is made to determine if the request is from a node 14 within network 12a. If so, connection manager 124 (see FIG. 10) attempts to service the query through query module 120 (see FIG. 10) to determine a cost efficient path within network 12a, at step 266. If at step 264 it is determined that the connect request is not from a node 14 within network 12a, processing moves to step 268. At step 268 a ping message is sent to connected nodes 14 within networks 12b to 12n. At step 270 one or more pongs are received and a decision is made at step 272 which connection to a specific external node 14 should be utilized. Step 272 may utilize a variety of methods to determine which connections to keep and which to drop. Typically, step 272 would maintain connections based upon the amount of data, cost class, and the total number of connections that may be maintained. If at step 272 a node 14 is found to be no better than an existing connection, it is dropped at step 274. If at step 272 a better connection is found, it is added to content index 136 at step 276.

Although this disclosure and the claims appended hereto make use of the terms query, queryhit, ping, pong, push and connect, it is not the intent of the inventor for these terms to be specifically associated with the Gnutella protocol. To the inventor the term query is analogous to a request for data and queryhit to a reply to a query, indicating that the data has been located. A ping is a standard computer communications term and is short for Packet Internet Groper; in essence it is a message to determine whether a specific computer in a network is accessible. A pong is a response to a ping. A push is a message sent directly to a node that is protected by a firewall. A push is used to request a direct connection between the node behind the firewall and the node sending the push message so that the node behind the firewall can "push" data to the requesting node. A connect is a connection between two nodes.

Although the disclosure refers to a PPO within an ISP by way of example, it is not the intent of the inventor to restrict the invention to such a configuration. For example a PPO may be used within any network, including networks utilized by corporations to exchange data with their employees or customers. Further, multiple PPO's may be utilized to provide redundancy in case one PPO fails and also to provide load balancing. In the case of a network 12 utilizing a single PPO, if the PPO failed, network 12 would revert to the status quo without the PPO; i.e. all P2P messages are exchanged with no decision made on who should service the request.

Although the invention has been described with reference to certain specific embodiments, various modifications thereof will be apparent to those skilled in the art without departing from the spirit and scope of the invention as outlined in the claims appended hereto.

I claim:

1. A peer to peer optimizer system comprising;
   a path cost module configured to receive information about path cost between nodes in a network;
   a configuration module storing the IP addresses of the nodes said optimizer system is aware of;
   an index fetch module configured to receive information about locations of content available for access from at least one of said nodes;
   a query routing module configured to examine peer to peer messages received by the optimizer system to determine information about content contained in said messages received by the optimizer system; and
   a fetch redirection module configured to redirect said messages to a lower cost source of content based on the information about said content contained in said messages, the information about locations of content and the path cost between nodes, and configured to monitor all peer to peer messages between nodes connected by said optimizer system.

2. The system of claim 1 wherein a peer to peer message may be modified in addition to the rewriting of routing information.

3. The system of claim 1 wherein a peer to peer message may be forwarded.

4. The system of claim 1 wherein a peer to peer message may not be forwarded.

5. The system of claim 1 wherein new peer to peer messages may be created.

6. The system of claim 1 wherein if a peer to peer message is a query message, forwarding said query message to an optimized set of nodes.

7. The system of claim 6 further comprising a content index.

8. The system of claim 7 wherein said content index comprises a mapping of content to nodes.

9. The system of claim 8 wherein said content index is used to limit the number of nodes a query message is forwarded to.

10. The system of claim 8 wherein said content index is used to determine said optimized set of nodes.

11. The system of claim 10 wherein said optimized set of nodes is selected based upon path cost.

12. The system of claim 10 wherein if no nodes are found in said content index to satisfy said query message, forwarding said query message to a set of nodes determined by a weighted probabilistic function.

13. The system of claim 1 wherein if a peer to peer message is a queryhit message, said optimizer modifying quality of service parameters of said queryhit message.

14. The system of claim 1 wherein if a peer to peer message is a ping message from a first node, said optimizer creating one or more pong messages to nodes in the same cost class as said first node.

15. The system of claim 1 wherein cost class information for a plurality of nodes is stored in a host cache.

16. The system of claim 15 wherein said path cost information is set by an administrator of said optimizer.

17. The system of claim 15 wherein said path cost information is set by said optimizer.

18. The system of claim 1 wherein if a peer to peer message is a connect, and if said connect is better than an existing connection, dropping said existing connection for said connect.

19. The system of claim 1 wherein said optimizer in determining said path cost combines a cost class for each of two nodes to create said path cost.

20. The system of claim 19 wherein said cost class is set by an administrator of said optimizer.

21. The system of claim 19 wherein said cost class is set by said optimizer.

22. The system of claim 1 wherein if a peer to peer message is not from a node in a first network and is a query message, forwarding said query message to one or more nodes not in said first network.

23. The system of claim 1 wherein if a peer to peer message is from a node in a first network and is a query message and if said query message is unsuccessful, forwarding said query message to a weighted list of nodes in said first network.

24. The system of claim 1 wherein if a peer to peer message is not from a node in a first network and is a query message, ignoring said query message.

25. The system of claim 1 wherein if a peer to peer message is a queryhit message, determining if a matching query message has been observed and if so forwarding said queryhit message to the originator of said matching query message.

26. The system of claim 1 wherein if a peer to peer message is a query message said optimizer determining;
   a) if said query is from a node in a first network, determining if said query may be serviced by one or more nodes in said first network, if so, forwarding said query to said one or more nodes in said first network; or
   b) if said query is from a node not in said first network, dropping said query.

27. The system of claim 1 wherein if a peer to peer message is a queryhit message, forwarding said queryhit message to the originator of a matching query message.

28. The system of claim 1 wherein if a peer to peer message is a ping message from a node in a first network dropping said ping message so that it does not propagate from said first network.

29. The system of claim 1 wherein if a peer to peer message is a pong and a matching ping message has not been seen, dropping said pong.

30. The system of claim 1 wherein if a peer to peer message is a ping, said optimizer optionally dropping said ping.

31. The system of claim 30 wherein if said optimizer has not dropped said ping, said optimizer providing a forged pong message.

32. The system of claim 1 wherein each peer to peer message is examined to obtain information about the originator of said message.

33. The system of claim 32 wherein said information is stored by said optimizer in a host cache.

34. A process for managing peer to peer messages between nodes, said process comprising:
receiving peer to peer messages between said nodes;
determining a path cost for said received peer to peer messages;
examining said received peer to peer messages for a location of content requested and redirecting said messages to a lower cost source of said content based upon said path cost and the location of said content to direct said messages to a cost efficient path;
monitoring all peer to peer messages between said nodes connected to an optimizer system; and
storing the IP addresses of the nodes.

35. The process of claim 34 further comprising the step of utilizing a message to obtain information about the originator of said message.

36. The process of claim 34 further comprising the step of matching a requested filename to filenames stored in a content index.

37. The process of claim 36 further comprising the step of utilizing said content index in determining said cost efficient path.

38. The process of claim 34 further comprising the step of utilizing cost class information to determine said cost efficient path.

39. The process of claim 34 further comprising the step of modifying a peer to peer message in addition to the rewriting of routing information.

40. The process of claim 34 further comprising the step of forwarding a peer to peer message.

41. The process of claim 34 further comprising the step of not forwarding a peer to peer message.

42. The process of claim 34 further comprising the step of creating a new peer to peer message.

43. The process of claim 34 further comprising the step that if said peer to peer message is a query message, forwarding said query message to an optimized set of nodes.

44. A computer readable medium containing instructions, which, when executed on a processing device cause the processing device to execute the process of claim 34.

45. The medium of claim 44 further comprising instructions for modifying a peer to peer message.

46. The medium of claim 44 further comprising instructions for forwarding a peer to peer message.

47. The medium of claim 44 further comprising instructions for not forwarding a peer to peer message.

48. The medium of claim 44 further comprising instructions for creating a new peer to peer message.

49. The medium of claim 44 further comprising instructions to determine if a peer to peer message is a query message, and if so, forwarding said query message to an optimized set of nodes.

50. The medium of claim 49 further comprising instructions to implement a content index.

51. The medium of claim 50 further comprising instructions to map content to nodes.

52. The medium of claim 50 further comprising instructions to utilize said content index to limit the number of nodes a query message is forwarded to.

53. The medium of claim 52 further comprising instructions to utilize said content index to determine said optimized set of nodes.

54. The medium of claim 53 further comprising instructions to select said optimized set of nodes based upon path cost.

55. The medium of claim 53 further comprising instructions to determine that if no nodes are found in said content index to satisfy said query message, forwarding said query message to a set of nodes determined by a weighted probabilistic function.

56. The medium of claim 44 further comprising instructions to determine if a peer to peer message is a queryhit message, if so, modifying quality of service parameters of said query hit message.

57. The medium of claim 44 further comprising instructions to determine if a peer to peer message is a ping message from a first node, if so, creating one or more pong messages to nodes in the same cost class as said first node.

58. The medium of claim 44 further comprising instructions for storing cost class information in a host cache.

59. The medium of claim 58 further comprising instructions to permit an administrator to set said cost class information.

60. The medium of claim 58 further comprising instructions to set said cost class information without human intervention.

61. The medium of claim 44 further comprising instructions to determine if a peer to peer message is a connect, if so, and if said connect is better than an existing connection, dropping said existing connection for said connect.

62. The medium of claim 44 further comprising instructions for determining if a message is from a node in a first network, and instructions for preventing said message from reaching a node in a second network.

63. The medium of claim 44 further comprising instructions for utilizing a message to obtain information about the node from which said message originated.

64. The medium of claim 63 further comprising instructions to populate a host cache with said information.

65. The medium of claim 44 further comprising instructions to determine if a peer to peer message is not initially directed to a cost efficient path, redirecting said peer to peer message to said cost efficient path.

66. A method of managing peer to peer message routing, said method comprising:
receiving information about path cost between nodes in a network;
receiving information about the location of content available from said nodes;
receiving peer to peer messages;
examining said peer to peer messages to determine information about content contained in said messages;
redirecting said peer to peer messages, to a lower cost source of content based upon the information about content contained in said messages, the information about the location of content and the path cost between nodes;
monitoring all peer to peer messages that are redirected; and
storing the IP addresses of the nodes.

67. The method of claim 66 wherein the network comprises a plurality of networks.

68. The method of claim 66 further comprising modifying the information about content contained in said messages.

69. The method of claim 66 further comprising modifying timing information contained in said messages.

* * * * *

UNITED STATES PATENT AND TRADEMARK OFFICE
CERTIFICATE OF CORRECTION

| | | |
|---|---|---|
| PATENT NO. | : 7,571,251 B2 | Page 1 of 3 |
| APPLICATION NO. | : 10/138336 | |
| DATED | : August 4, 2009 | |
| INVENTOR(S) | : Bowman | |

It is certified that error appears in the above-identified patent and that said Letters Patent is hereby corrected as shown below:

Column 12, lines 27 and 28: Delete "15 wherein said path cost information is set by an administrator of said optimizer." and insert therefor -- 1 wherein if a peer to peer message is a connect, and if said connect is better than an existing connection, dropping said existing connection for said connect. --;

Column 12, line 30: insert -- an administrator of -- between the words "is set by" and "said optimizer.";

Column 12, lines 31 to 34: Delete "1 wherein if a peer to peer message is a connect, and if said connect is better than an existing connection, dropping said existing connection for said connect." and insert therefor -- 15 wherein said path cost information is set by said optimizer. --;

Column 12, lines 38 and 39: Delete "19 wherein said cost class is set by an administrator of said optimizer." and insert therefor -- 1 wherein if a peer to peer message is not from a node in a first network and is a query message, forwarding said query message to one or more nodes not in said first network. --;

Column 12, lines 40 and 41: Delete "19 wherein said cost class is set by said optimizer." and insert therefor -- 1 wherein if a peer to peer message is from a node in a first network and is a query message and if said query message is unsuccessful, forwarding said query message to a weighted list of nodes in said first network. --;

Column 12, lines 44 and 45: Delete "forwarding said query message to one or more nodes not in said first network." and insert therefor -- ignoring said query message. --;

Column 12, lines 47 to 49: Delete "from a node in a first network and is a query message and if said query message is unsuccessful, forwarding said query message to a weighted list of nodes in said first network." and insert therefor -- a queryhit message, determining if a matching query message has been observed and if so forwarding said queryhit message to the originator of said matching query message. --;

Column 12, lines 51 and 52: Delete "not from a node in a first network and is a query message, ignoring said query message." and insert therefor -- a query message said optimizer determining; --;

UNITED STATES PATENT AND TRADEMARK OFFICE
CERTIFICATE OF CORRECTION

| | |
|---|---|
| PATENT NO. | : 7,571,251 B2 |
| APPLICATION NO. | : 10/138336 |
| DATED | : August 4, 2009 |
| INVENTOR(S) | : Bowman |

It is certified that error appears in the above-identified patent and that said Letters Patent is hereby corrected as shown below:

Column 12, lines 54 to 56: Delete "determining if a matching query message has been observed and if so forwarding said queryhit message to the originator of said matching query message." and insert therefor -- forwarding said queryhit message to the originator of a matching query message. --;

Column 12, lines 58 to 64: Delete "query message said optimizer determining; a) if said query is from a node in a first network, determining if said query may be serviced by one or more nodes in said first network, if so, forwarding said query to said one or more nodes in said first network; or b) if said query is from a node not in said first network, dropping said query" and insert therefor -- ping message from a node in a first network dropping said ping message so that it does not propagate from said first network. --;

Column 12, lines 66 and 67: Delete "queryhit message, forwarding said queryhit message to the originator of a matching query message." and insert therefor -- pong and a matching ping message has not been seen, dropping said pong. --;

Column 13, lines 2 to 4: Delete "message from a node in a first network dropping said ping message so that it does not propagate from said first network." and insert therefor -- , said optimizer optionally dropping said ping. --;

Column 13, lines 5 to 7: Delete "a peer to peer message is a pong and a matching ping message has not been seen, dropping said pong" and insert therefor -- said optimizer has not dropped said ping, said optimizer providing a forged pong message. --;

Column 13, lines 8 and 9: Delete "if a peer to peer message is a ping, said optimizer optionally dropping said ping." and insert therefor -- said cost class is set by an administrator of said optimizer. --;

Column 13, lines 10 to 12: Delete "30 wherein if said optimizer has not dropped said ping, said optimizer providing a forged pong message." and insert therefor -- 19 wherein said cost class is set by said optimizer. --;

Column 14, lines 34 and 35: Delete "58" and insert therefor -- 44 --; delete "permit an administrator to set said cost class information." and insert therefor -- determine if a peer to peer message is a connect, if so, and if said connect is better than an existing connection, dropping said existing connection for said connect. --;

UNITED STATES PATENT AND TRADEMARK OFFICE
CERTIFICATE OF CORRECTION

PATENT NO. : 7,571,251 B2
APPLICATION NO. : 10/138336
DATED : August 4, 2009
INVENTOR(S) : Bowman It is certified that error appears in the above-identified patent and that said Letters Patent is hereby corrected as shown below:

Column 14, lines 37 and 38: Delete "set said cost class information without human intervention." and insert therefor -- permit an administrator to set said cost class information. --;

Column 14, lines 39 to 42: Delete "44" and insert therefor -- 58 --; delete "determine if a peer to peer message is a connect, if so, and if said connect is better than an existing connection, dropping said existing connection for said connect." and insert therefor -- set said cost class information without human intervention. --;

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,571,251 B2  Page 1 of 1
APPLICATION NO. : 10/138336
DATED : August 4, 2009
INVENTOR(S) : Don Bowman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Seventh Day of September, 2010

David J. Kappos
*Director of the United States Patent and Trademark Office*